(12) United States Patent
Burnside et al.

(10) Patent No.: US 9,077,041 B2
(45) Date of Patent: Jul. 7, 2015

(54) ELECTRODE STRUCTURE FOR ELECTROCHEMICAL CELL

(71) Applicant: Sion Power Corporation, Tucson, AZ (US)

(72) Inventors: Savannah V. Burnside, Tucson, AZ (US); Christopher T. S. Campbell, Tucson, AZ (US); Chariclea Scordilis-Kelley, Tucson, AZ (US); William F. Wilkening, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 17 days.

(21) Appl. No.: 13/766,862

(22) Filed: Feb. 14, 2013

(65) Prior Publication Data

US 2013/0224601 A1   Aug. 29, 2013

Related U.S. Application Data

(60) Provisional application No. 61/598,456, filed on Feb. 14, 2012.

(51) Int. Cl.
*H01M 4/80* (2006.01)

(52) U.S. Cl.
CPC ............... *H01M 4/805* (2013.01); *H01M 4/80* (2013.01)

(58) Field of Classification Search
None
See application file for complete search history.

(56) References Cited

U.S. PATENT DOCUMENTS

| | | | |
|---|---|---|---|
| 2,877,113 A | 3/1959 | Fitzer | |
| 3,716,409 A | 2/1973 | Cairns et al. | |
| 3,833,421 A | 9/1974 | Rubischko et al. | |
| 3,907,579 A | 9/1975 | Ravault | |
| 3,951,689 A | 4/1976 | Ludwig | |
| 4,011,374 A | 3/1977 | Kaun | |
| 4,116,804 A | 9/1978 | Needes | |
| 4,169,120 A | 9/1979 | Miller | |
| 4,184,013 A | 1/1980 | Weddigen et al. | |

(Continued)

FOREIGN PATENT DOCUMENTS

| | | |
|---|---|---|
| CN | 1534811 A | 10/2004 |
| CN | 1574427 | 2/2005 |

(Continued)

OTHER PUBLICATIONS

International Search Report and Written Opinion for Application No. PCT/US2013/026054 mailed May 25, 2013.

(Continued)

*Primary Examiner* — Patrick Ryan
*Assistant Examiner* — Christopher Domone
(74) *Attorney, Agent, or Firm* — Wolf, Greenfield & Sacks, P.C.

(57) ABSTRACT

The present invention relates to the use of porous structures comprising electrode active materials, which can be used as electrodes in electrochemical cells. In certain embodiments, the electrodes described herein can comprise a first porous support structure (e.g., a plurality of particles, which can be porous in certain cases) in which electrode active material is at least partially contained. The first porous support structure can be, in some embodiments, at least partially contained within the pores of a second porous support structure (e.g., an agglomeration of elongated fibers, a porous web formed by sintered particles, etc.) containing pores that are larger than the components of the first porous support structure.

14 Claims, 12 Drawing Sheets

(56) References Cited

U.S. PATENT DOCUMENTS

| | | | |
|---|---|---|---|
| 4,235,528 A | 11/1980 | Yano et al. |
| 4,331,477 A | 5/1982 | Kubo et al. |
| 4,339,325 A | 7/1982 | Solomon et al. |
| 4,384,029 A | 5/1983 | Kordesch et al. |
| 4,410,609 A | 10/1983 | Peled et al. |
| 4,556,618 A | 12/1985 | Shia |
| 4,664,991 A | 5/1987 | Perichaud et al. |
| 4,677,415 A | 6/1987 | Howng |
| 4,683,178 A | 7/1987 | Stadnick et al. |
| 4,739,018 A | 4/1988 | Armand et al. |
| 4,770,956 A | 9/1988 | Knoedler |
| 4,833,048 A | 5/1989 | Dejonghe et al. |
| 4,917,974 A | 4/1990 | De Jonghe et al. |
| H858 H | 12/1990 | Leonard et al. |
| 5,126,082 A | 6/1992 | Frank |
| 5,162,175 A | 11/1992 | Visco et al. |
| 5,194,341 A | 3/1993 | Bagley et al. |
| 5,290,414 A | 3/1994 | Marple |
| 5,324,599 A | 6/1994 | Oyama et al. |
| 5,328,946 A | 7/1994 | Tuminello et al. |
| 5,433,917 A | 7/1995 | Srivastava et al. |
| 5,441,831 A | 8/1995 | Okamoto et al. |
| 5,462,566 A | 10/1995 | Skotheim |
| 5,516,598 A | 5/1996 | Visco et al. |
| 5,529,860 A | 6/1996 | Skotheim et al. |
| 5,538,812 A | 7/1996 | Lee et al. |
| 5,582,623 A | 12/1996 | Chu |
| 5,601,947 A | 2/1997 | Skotheim et al. |
| 5,648,187 A | 7/1997 | Skotheim |
| 5,686,201 A | 11/1997 | Chu |
| 5,690,702 A | 11/1997 | Skotheim et al. |
| 5,698,339 A | 12/1997 | Kawakami et al. |
| 5,723,230 A | 3/1998 | Naoi et al. |
| 5,783,330 A | 7/1998 | Naoi et al. |
| 5,792,575 A | 8/1998 | Naoi et al. |
| 5,814,420 A | 9/1998 | Chu |
| 5,882,812 A | 3/1999 | Visco et al. |
| 5,882,819 A | 3/1999 | Naoi et al. |
| 5,895,732 A | 4/1999 | Clough |
| 5,919,587 A | 7/1999 | Mukherjee et al. |
| 5,961,672 A | 10/1999 | Skotheim et al. |
| 5,989,467 A | 11/1999 | Daws et al. |
| 6,030,720 A | 2/2000 | Chu et al. |
| 6,110,417 A | 8/2000 | Sugikawa |
| 6,110,621 A | 8/2000 | Sandi et al. |
| 6,117,590 A | 9/2000 | Skotheim et al. |
| 6,143,216 A | 11/2000 | Loch et al. |
| 6,153,337 A | 11/2000 | Carlson et al. |
| 6,168,694 B1 | 1/2001 | Huang et al. |
| 6,201,100 B1 | 3/2001 | Gorkovenko et al. |
| 6,306,545 B1 | 10/2001 | Carlson et al. |
| 6,358,643 B1 | 3/2002 | Katz et al. |
| 6,403,261 B2 | 6/2002 | Mitkin et al. |
| 6,528,211 B1 | 3/2003 | Nishimura et al. |
| 6,544,688 B1 | 4/2003 | Cheng |
| 6,558,847 B1 | 5/2003 | Kawakami et al. |
| 6,680,013 B1 | 1/2004 | Stein et al. |
| 6,753,036 B2 | 6/2004 | Jankowski et al. |
| 6,913,998 B2 | 7/2005 | Jankowski et al. |
| 7,019,494 B2 | 3/2006 | Mikhaylik |
| 7,029,796 B2 | 4/2006 | Choi et al. |
| 7,157,185 B2 | 1/2007 | Marple |
| 7,247,408 B2 | 7/2007 | Skotheim et al. |
| 7,250,233 B2 | 7/2007 | Choi et al. |
| 7,361,431 B2 | 4/2008 | Kim et al. |
| 7,553,584 B2 | 6/2009 | Chiang et al. |
| 7,579,112 B2 | 8/2009 | Chiang et al. |
| 7,695,861 B2 | 4/2010 | Kolosnitsyn et al. |
| 7,771,870 B2 | 8/2010 | Affinito et al. |
| 8,087,309 B2 | 1/2012 | Kelley et al. |
| 2001/0024749 A1 | 9/2001 | Michot et al. |
| 2001/0034934 A1 | 11/2001 | Xu et al. |
| 2002/0018933 A1 | 2/2002 | Mitkin et al. |
| 2002/0192557 A1 | 12/2002 | Choi et al. |
| 2003/0073000 A1 | 4/2003 | Lee et al. |
| 2003/0082446 A1 | 5/2003 | Chiang et al. |
| 2003/0099884 A1 | 5/2003 | Chiang et al. |
| 2003/0108785 A1 | 6/2003 | Wu et al. |
| 2003/0113622 A1 | 6/2003 | Blasi et al. |
| 2003/0113624 A1 | 6/2003 | Kim et al. |
| 2003/0124416 A1 | 7/2003 | Kaneta |
| 2003/0129500 A1 | 7/2003 | Gan et al. |
| 2003/0180611 A1 | 9/2003 | Mikhaylik et al. |
| 2003/0222048 A1 | 12/2003 | Asakawa et al. |
| 2003/0228518 A1 | 12/2003 | Marple |
| 2004/0037771 A1 | 2/2004 | Meissner et al. |
| 2004/0047798 A1 | 3/2004 | Oh et al. |
| 2004/0118698 A1 | 6/2004 | Lu et al. |
| 2004/0191607 A1 * | 9/2004 | Nobuta et al. ............... 429/40 |
| 2004/0234851 A1 | 11/2004 | Kim et al. |
| 2005/0008938 A1 | 1/2005 | Cho et al. |
| 2005/0048371 A1 | 3/2005 | Nagayama et al. |
| 2005/0156575 A1 | 7/2005 | Mikhaylik |
| 2005/0158535 A1 | 7/2005 | Zhang et al. |
| 2005/0175904 A1 | 8/2005 | Gorkovenko |
| 2005/0234177 A1 | 10/2005 | Zaghib et al. |
| 2005/0266990 A1 | 12/2005 | Iwasaki et al. |
| 2006/0024579 A1 | 2/2006 | Kolosnitsyn et al. |
| 2006/0115579 A1 | 6/2006 | Mukherjee et al. |
| 2006/0194096 A1 | 8/2006 | Valle et al. |
| 2006/0238203 A1 | 10/2006 | Kelley et al. |
| 2007/0065701 A1 | 3/2007 | Cable et al. |
| 2007/0207370 A1 | 9/2007 | Kwak et al. |
| 2007/0221265 A1 | 9/2007 | Affinito et al. |
| 2007/0224502 A1 | 9/2007 | Affinito et al. |
| 2008/0100264 A1 | 5/2008 | Kolosnitsyn et al. |
| 2008/0187663 A1 | 8/2008 | Affinito |
| 2008/0246580 A1 | 10/2008 | Braun et al. |
| 2008/0318128 A1 | 12/2008 | Simoneau et al. |
| 2009/0053607 A1 | 2/2009 | Jeong et al. |
| 2009/0098457 A1 | 4/2009 | Kwon et al. |
| 2009/0159853 A1 | 6/2009 | Sengupta et al. |
| 2009/0200986 A1 | 8/2009 | Kopera et al. |
| 2009/0311604 A1 | 12/2009 | Nazar et al. |
| 2010/0035128 A1 | 2/2010 | Scordilis-Kelley et al. |
| 2010/0068623 A1 | 3/2010 | Braun et al. |
| 2010/0129699 A1 | 5/2010 | Mikhaylik et al. |
| 2010/0239914 A1 | 9/2010 | Mikhaylik et al. |
| 2011/0008531 A1 | 1/2011 | Mikhaylik et al. |
| 2011/0045346 A1 | 2/2011 | Chiang et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0165466 A1 * | 7/2011 | Zhamu et al. ............... 429/231.8 |
| 2011/0177398 A1 * | 7/2011 | Affinito et al. ............... 429/325 |
| 2011/0206992 A1 | 8/2011 | Campbell et al. |
| 2011/0256450 A1 | 10/2011 | Campbell et al. |
| 2012/0048729 A1 | 3/2012 | Mikhaylik et al. |
| 2012/0070746 A1 | 3/2012 | Mikhaylik et al. |
| 2013/0252103 A1 | 9/2013 | Mikhaylik et al. |
| 2013/0316072 A1 | 11/2013 | Scordilis-Kelley et al. |

FOREIGN PATENT DOCUMENTS

| | | |
|---|---|---|
| CN | 101026247 | 8/2007 |
| EP | 0 700 109 A1 | 3/1996 |
| GB | 1 011 353 A | 11/1965 |
| GB | 1 396 062 A | 5/1975 |
| JP | 05-325978 A | 12/1993 |
| JP | 09-147868 A | 6/1997 |
| JP | 11-176423 A | 7/1999 |
| JP | 2001-093577 | 4/2001 |
| JP | 2003-193110 A | 7/2003 |
| JP | 2003-303588 | 10/2003 |
| JP | 2005-251429 A | 9/2005 |
| JP | 2005-310836 A | 11/2005 |
| JP | 2006-143478 | 6/2006 |
| JP | 2007-234338 A | 9/2007 |
| JP | 2009-076260 A | 4/2009 |
| JP | 2010-009856 A | 1/2010 |
| KR | 10-0436712 B1 | 6/2004 |
| KR | 10-0484642 B1 | 4/2005 |

(56) References Cited

FOREIGN PATENT DOCUMENTS

| WO | WO 99/33125 A1 | 7/1999 |
|---|---|---|
| WO | WO 99/33130 A1 | 7/1999 |
| WO | WO 2007/028972 A1 | 3/2007 |
| WO | WO 2008/153749 A1 | 12/2008 |
| WO | WO 2009/017726 A1 | 2/2009 |
| WO | WO 2009/042071 A2 | 4/2009 |
| WO | WO 2009/054987 A1 | 4/2009 |
| WO | WO 2009/089018 A2 | 7/2009 |
| WO | WO 2009/114314 A2 | 9/2009 |
| WO | WO 2010/062391 A2 | 6/2010 |
| WO | WO 2010/074690 A1 | 7/2010 |
| WO | WO 2012/027457 A2 | 3/2012 |
| WO | WO 2012/149672 A1 | 11/2012 |

OTHER PUBLICATIONS

Ahn et al., Electrochemical Properties of Sulfur with Various Particle Size for Lithium Sulfur Batteries. 44th Power Sources Conference 2010. Las Vegas, Nevada, USA. Jun. 14-17, 2010.
Barchasz, et al., Novel positive electrode architecture for rechargeable lithium/sulfur batteries. Journal of Power Sources. 2012; 211:19-26.
Brunauer et al., Adsorption of Gases in Multimolecular Layers. J Am Chem Soc. 1938;60(2):309-19.
Campbell et al., Electrodeposition of Mesoporous Nickel onto Foamed Metals Using Surfactant and Polymer Templates. J Porous Mater. 2004;11(2):63-69.
Cheon et al., Capacity fading mechanisms on cycling a high-capacity secondary sulfur cathode. J Electrochem Soc. Oct. 29, 2004;151(12):A2067-73.
Cheon et al., Rechargeable lithium sulfur battery: II. Rate capability and cycle characteristics. J Electrochem Soc. May 5, 2003;150(6):A800-05.
Choi et al. Challenges Facing Lithium Batteries and Electrical Double-Layer Capacitors. Angew. Chem. Int. Ed. 2012; 51: 9994-10024.
Cunningham et al., Phase Equilibria in Lithium-Chalcogen Systems. J Electrochem Soc. 1972;119:1448-50.
Doherty et al., Colloidal Crystal Templating to Produce Hierarchically Porous LiFePO4 Electrode Materials for High Power Lithium Ion Batteries. Chem Mater. 2009;21(13):2895-2903.
Garboczi, Permeability, diffusivity, and microstructural parameters: A critical review. Cement and Concrete Res. Jul. 1990;20(4):591-601.
Gonzenbach et al., Macroporous ceramics from particle-stabilized wet foams. J Am Ceram Soc. 2007;90(1):16-22.
Guo et al. Sulfur-Impregnated Disordered Carbon Nanotubes Cathode for LithiumSulfur Batteries. Nano Lett. 2011; 11:4288-4294. Including Supporting Information.
Hagen et al. Development and costs calculation of lithium—sulfur cells with high sulfur load and binder free electrodes. Journal of Power Sources. 2013; 224:260-268.
Hagen et al. Lithium—sulphur batteries e binder free carbon nanotubes electrode examined with various electrolytes. Journal of Power Sources. 2012; 213: 239-248.
Hassoun et al., A High-Performance Polymer Tin Sulfur Lithium Ion Battery. Angew. Chem. Int. Ed. 2010, 49, 2371-2374.
Hayashi et al., All-solid-state rechargeable lithium batteries with Li2S as a positive electrode material. Journal of Power Sources 183 (2008) 422-426.
He et al. High "C" rate Li—S cathodes: sulfur imbibed bimodal porous carbons. Energy Environ. Sci. 2011; 4:2878.
Ji et al., A highly ordered nanostructured carbon—sulphur cathode for lithium—sulphur batteries. Nature Mater. May 17, 2009;8(6):500-06.
Ji et al. Graphene Oxide as a Sulfur Immobilizer in High Performance Lithium/Sulfur Cells. J. Am. Chem. Soc. 2011; 133:18533-18525. Including Shipping Information.
Kim et al., Correlation between positive-electrode morphology and sulfur utilization in lithium—sulfuf battery. J Power Sources. May 20, 2004;132(1-2):209-12.
Kim et al. High temperature stabilization of lithium—sulfur cells with carbon nanotube current collector. Journal of Power Sources. 2013; 226:256-265.
Kulinowski et al., Porous metals from colloidal templates. Adv Mater. 2000;12(11): 833-38.
Lai et al., Synthesis and Electrochemical Performance of Sulfur/Highly Porous Carbon Composites. J. Phys. Chem. C 2009, 113, 4712-4716.
Mikhaylik et al., 380 Wh/kg Rechargeable Li/S Batteries Operating at 90% of Sulfur Utilization. 206th Meeting of The Electrochemical Society. Honolulu, Hawaii. Oct. 3-8, 2004. Abst. 443.
Mikhaylik et al., Polysulfide Shuttle Study in the Li/S Battery System. J Electrochem Soc. 2004;151:A1969-76.
Mikhaylik et al. Increasing Li—S Battery Cycle Life, and Improving Safety, through Application of a Variety of Coating Techniques. Soc Vac Coat 54th Ann. 2011; 589.
Nagao et al. All-solid-state Li—sulfur batteries with mesoporous electrode and thio-lisicon solid electrolyte. Journal of Power Sources. 2013; 222: 237-242.
Peer, Tef_methy_ethyl. Accessed online at peer.tamu.edu/curriculum_modules/properties/module_3/Tef_methyl_ethyl.html. Last accessed May 31, 2013. 1 page.
Probst et al., Structure and electrical properties of carbon black. Carbon. Feb. 2002;40(2):201-5.
Rao et al. Lithium—sulfur cell with combining carbon nanofibersesulfur cathode and gel polymer electrolyte. Journal of Power Sources. 2012; 212:179-185.
Rao et al. Porous carbon—sulfur composite cathode for lithium/sulfur cells. Electrochemistry Communications. 2012; 17:1-5.
Rauh et al., A Lithium/Dissolved Sulfur Battery with an Organic Electrolyte. J Electrochem Soc. 1979;126:523-27.
Ravikrishna et al., Low-temperature synthesis of porous hydroxyapatite scaffolds using polyaphron templates. J Sol-Gel Sci Techn. Apr. 2006;38(2):203-10.
Ronci et al., A novel approach to in situ diffractometry of intercalation materials: the EDXD technique. Preliminary results of LiNi$_{0.8}$Co$_{0.2}$O$_2$. Electrochem Solid-State Lett. 2000;3(4):174-7.
Ruiz-Morales et al., Microstructural optimisation of materials for SOFC applications using PMMA microspheres. J Mater Chem. 2006;165:540-42.
Ryu et al., Discharge behavior of lithium/sulfur cell with TEGDME based electrolyte at low temperature. J Electrochem Soc. 2006;163:201-06.
Sakka et al., Fabrication of porous ceramics with controlled pore size by colloidal processing. Sci Technol Adv Mater. Nov. 2005;6(8):915-20.
Shim et al., The Lithium/Sulfur Rechargeable Cell. Effects of Electrode Composition and Solvent on Cell Performance. J Electrochem Soc. 2002;149:A1321-25.
Shin et al., Characterization of N-Methyl- N-Butylprrolidinium Bis(trifluoromethanesulfonyl)imide-LiTFSI-Tetra(ethylene gylcol) Dimethyl Ether Mixtures as a Li Metal Cell Electrolyte. J Power Sources. 2008;155:A368-73.
Su et al. A new approach to improve cycle performance of rechargeable lithium—sulfur batteries by inserting a free-standing MWCNT interlayer. Chem. Commun. 2012; 48:8817-8819. Including Supplementary Material.
Takeuchi et al., Preparation of electrochemically active lithium sulfide—carbon composites using spark-plasma-sintering process. Journal of Power Sources 195 (2010) 2928-2934.
Wang et al., Electrochemical characteristics of sulfur composite cathode materials in rechargeable lithium batteries. J Power Sources. Nov. 15, 2004;138(1-2):271-73.
Wang et al., Polymer lithium cells with sulfur composites as cathode materials. Electrochimica Acta 48 (2003) 1861-1867.
Wang et al., Sulfur—carbon nano-composite as cathode for rechargeable lithium battery based on gel electrolyte. Electrochem Comm. 2002;4(6):499-502.

(56) References Cited

OTHER PUBLICATIONS

Wang et al. Graphene-Wrapped Sulfur Particles as a Rechargeable LithiumSulfur Battery Cathode Material with High Capacity and Cycling Stability. Nano Lett. 2011; 11:2644-2647.

Woo et al., Preparation and characterization of three demensionally ordered macroporous $Li_4Ti_5O_{12}$ anode for lithium batteries. Electrochimica Acta. 2007;53(1):79-82.

Yin et al. A novel pyrolyzed polyacrylonitrile-sulfur@MWCNT composite cathode material for high-rate rechargeable lithium/sulfur batteries. J. Mater. Chem. 2011; 21:6807. Including Supplementary Material.

Yin et al. Polyacrylonitrile/graphene composite as a precursor to a sulfur-based cathode material for high-rate rechargeable Li—S batteries. Energy Environ. Sci. 2012; 5:6966.

Yuan et al., Improvement of cycle property of sulfur-coated multi-walled carbon nanotubes composite cathode for lithium/sulfur batteries. J Power Sources. Apr. 15, 2009;189(2):1141-46.

Zhang et al., Dual-scale porous electrodes for solid oxide fuel cells from polymer foams. Adv Mater. 2005;17(4):487-91. Polymer lithium cells.

Zhang et al., Enhancement of long stability of sulfur cathode by encapsulating sulfur into micropores of carbon spheres. Energy & Environmental Science. 2010, 3, 1531-1537.

Zhang et al., Novel Nanosized Adsorbing Composite Cathode Materials for the Next Generational Lithium Battery. Journal of Wuhan University of Technology-Mater. Sci. Ed. 2007;22(2):234-39.

Zhang et al., Three-dimensional ordered macroporous platinum-based electrode for methanol oxidation. Chinese Sci Bulletin. Jan. 2006;51(1):19-24.

Zhang et al. A High Energy Density Lithium/Sulfur—Oxygen Hybrid Battery. $44^{th}$ Power Sources Conference 2010. Las Vegas, Nevada, USA. Jun. 14-17, 2010.

Zhang et al. A Li+-conductive microporous carbon—sulfur composite for Li—S batteries. Electrochimica Acta. 2013; 87:497-502.

Zhang et al. Facile and effective synthesis of reduced graphene oxide encapsulated sulfur via oil/water system for high performance lithium sulfer cells. J. Mater. Chem. 2012; 22:11452.

Zhang et al. One-step synthesis of branched sulfur/polypyrrole nanocomposite cathode for lithium rechargeable batteries. Journal of Power Sources. 2012; 208:1-8.

Zheng et al., Electrochemical properties of rechargeable lithium batteries with sulfur-containing composite cathode materials. Electrochem Solid-State Lett., May 12, 2006; 9(7):A364-A367.

Zheng et al., Novel nanosized adsorbing sulfur composite cathode materials for the advanced secondary lithium batteries. Electrochimica Acta. Jan. 5, 2006;51(7):1330-35.

Zheng et al. Amphiphilic Surface Modification of Hollow Carbon Nanofibers for Improved Cycle Life of Lithium Sulfur Batteries. Nano Lett. 2013; 12:1265-1270. Including Supporting Information.

Zheng et al. Hollow Carbon Nanofiber-Encapsulated Sulfur Cathodes for High Specific Capacity Rechargeable Lithium Batteries, Nano Lett. 2011; 11:4462-4467. Including Supporting Information.

Zhou et al. A flexible nanostructured sulphur—carbon nanotube cathode with high rate performance for Li—S batteries. Energy Environ. Sci. 2012; 5:8901.

Zu et al. Improved lithium—sulfur cells with a treated carbon paper interlayer. Phys.Chem. Chem. Phys., 2013; 15:2291.

\* cited by examiner

ELECTRODE STRUCTURE FOR ELECTROCHEMICAL CELL

RELATED APPLICATIONS

This application claims priority under 35 U.S.C. §119(e) to U.S. Provisional Patent Application Ser. No. 61/598,456, filed Feb. 14, 2012, and entitled "Electrode Structure for Electrochemical Cell," which is incorporated herein by reference in its entirety for all purposes.

TECHNICAL FIELD

Electrode structures for electrochemical cells, and associated systems and methods, are generally described.

BACKGROUND

A typical electrochemical cell includes a cathode and an anode which participate in an electrochemical reaction. Generally, electrochemical reactions are facilitated by an electrolyte, which can contain free ions and can behave as an ionically conductive medium.

The performance of an electrochemical cell can be enhanced by increasing the amount of contact between an electrode active material and the electrolyte, which can lead to an increase in the rate of the electrochemical reaction within the cell. In addition, the performance of an electrochemical cell can be enhanced by maintaining a high degree of electrical conductivity within the bulk of the electrodes. In some previous electrochemical cells, these objectives can be accomplished to some extent by employing porous electrodes comprising an electrode active material positioned on or within a support structure, such as an agglomeration of porous carbon particles. Electrode structures, and associated methods for making such structures, that further enhance the availability of the electrode active material and the electrical conductivity within the bulk of the electrode would be desirable.

SUMMARY

Electrode structures for electrochemical cells, and associated systems and methods, are provided. The subject matter of the present invention involves, in some cases, interrelated products, alternative solutions to a particular problem, and/or a plurality of different uses of one or more systems and/or articles.

In one aspect, an electrode for use in an electrochemical cell is described. In some embodiments, the electrode comprises a first porous support structure contained within the pores of a second, electrically conductive porous support structure, and an electrode active material contained within the pores of the first porous support structure.

In certain embodiments, the electrode comprises an assembly of elongated fibers; an assembly of particles at least partially contained within the assembly of elongated fibers; and an electrode active material at least partially contained within the assembly of particles.

In one aspect, a method of forming an electrode for use in an electrochemical cell is described. In certain embodiments, the method comprises depositing an electrode active material within the pores of a first porous support structure; and depositing the first porous support structure within the pores of a second, electrically conductive porous support structure.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
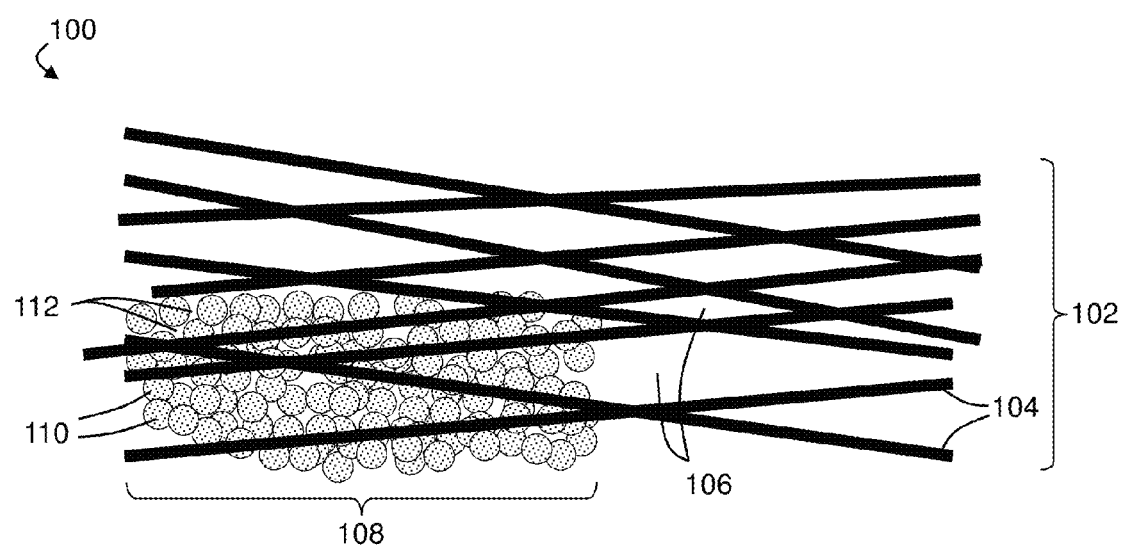
FIG. 1 is a cross-sectional schematic illustration of an electrode, according to one set of embodiments.

The present invention relates to the use of porous structures comprising electrode active materials, which can be used as electrodes in electrochemical cells. In certain embodiments, the electrodes described herein can comprise a first porous support structure (e.g., a plurality of particles, which can be porous in certain cases) in which electrode active material is at least partially contained. The first porous support structure can be, in some embodiments, at least partially contained within the pores of a second porous support structure (e.g., an agglomeration of elongated fibers, a porous web formed by sintered particles, etc.) containing pores that are larger than the components of the first porous support structure. In certain embodiments, the electrical conductivity of the relatively large-scale porous support structure material can be relatively high, which can allow one to produce an electrode with a relatively high bulk electrical conductivity. In addition, the relatively large-scale porous support structure can be configured, in certain embodiments, to provide a relatively stable scaffold. The relatively stable scaffold can allow for the application of an anisotropic force to the electrode while maintaining its structural integrity. The relatively stable scaffold can also ensure that the relatively small-scale porous support structure material and/or the electrode active material remains substantially evenly distributed through the bulk of the electrode (e.g., during use of an electrochemical cell containing the electrode).

In many previous electrochemical systems, electrodes are formed by depositing the electrode active material (which is often not highly electrically conductive) into the pores of a particulate porous support material that is more electrically conductive than the electrode active material. The particulate support material is then used to form an electrode, for example, by depositing the porous material onto an electrically conductive current collector, such as a metal foil or sheet, and drying the deposited support material. While the use of porous particulate support materials can allow one to control the pore size distribution of the assembled electrode (e.g., by controlling the porosity within and/or between the particles), such systems can also exhibit a variety of disadvantages. For example, in many cases, the bulk electrical conductivity of such electrodes is limited to the bulk electrical conductivity of the material used to form the particulate support structures, which, while usually higher than the electrode active material, is often still low. In addition, the electrically conductive current collector (e.g., a metal foil) on which the porous particles are deposited is often bulky and heavy, adding unnecessary volume and mass to the electrode and reducing the energy density and specific energy of the electrochemical cell in which it is incorporated.

In addition, in many cases, electrodes assembled by coating porous particles on current collectors are mainly or completely supported by binder within the electrode, which can lead to collapse of electrode during charge and/or discharge of the electrochemical cell as particles are shifted relative to each other. The structural integrity of such electrodes can be further compromised in systems in which anisotropic forces are applied to the cell during charge and/or discharge, including many lithium-sulfur cells such as those described in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

It has been discovered, within the context of one aspect of the invention, that the bulk electrical conductivity of an electrode can be improved while maintaining a relatively high degree of structural stability by including first and second porous support structures with different pore size distributions within the bulk of the electrode. In certain embodiments, the structural integrity of one or more electrodes within an electrochemical cell can be improved by incorporating a relatively-large scale porous support structure that, while supporting a relatively-small scale porous support structure, mechanically resists forces applied to the electrochemical cell during charge and/or discharge, which can inhibit changes in electrode porosity (and, therefore, changes in the permeability of the electrolyte through the electrode) during operation of the electrochemical cell. In addition, in certain embodiments, the energy density of an electrochemical cell can be improved by replacing a traditional current collector with a porous, lightweight, and electrically conductive large-scale porous support structure.

In many previous electrochemical systems, electrodes comprising support structures made of porous particulate materials in which porosity could be easily controlled (e.g., porous carbon particles) are insufficiently electrically conductive to provide sufficient performance. In addition, many electrodes comprising support structures made of highly electrically conductive materials (e.g., metals) have generally not been amenable to precise control of pore size. It has been discovered, within the context of the invention, that the use of multiple types of porous structures can allow one to form electrodes with both desirable pore size distributions as well as desirable bulk electrical conductivities. For example, in certain embodiments, a large-scale porous support structure can be made of one or more material(s) that are relatively highly electrically conductive, such as metals. By forming the electrode around a large-scale porous support structure comprising a material with a relatively high electrical conductivity, one can enhance the bulk electrical conductivity of the electrode, and, in some embodiments, eliminate the need for a separate, electrically conductive current collector. In certain embodiments, a small-scale porous support structure can be made of one or more material(s) within which pore size can be controlled relatively easily. For example, carbon particles, in which micron-scale pores can be incorporated relatively easily, can be used to form a small-scale porous support structure in certain cases, allowing one to more precisely control the final pore size distribution within the assembled electrode. The small scale porous support structure (which can be used to support an electrode active material) can be incorporated into the pores of the large-scale porous support structure, thereby providing both the electrical conductivity enhancements of the large-scale structure as well as the pore-size control of the small-scale structure.

The porous support structures described herein (including the small-scale and/or large scale porous support structures) can have any suitable form. In certain embodiments, the porous support structures described herein comprise assemblies of discrete components (e.g., assemblies of elongated fibers, assemblies of particles, etc.). As used herein, an "assembly" of components refers to a plurality of interconnected components. The components within the assembly can be directly interconnected (i.e., in direct contact with each other) in some instances. In some embodiments, the components within the assembly can be indirectly interconnected (i.e., in indirect contact with each other), for example, via a binder. In some instances, the porous support structure can comprise a porous agglomeration of discrete particles, within which the particles can be porous or non-porous. For example, the porous support structure might be formed by mixing porous or non-porous particles with a binder to form a porous agglomeration. As another example, the porous support structure can comprise, in certain embodiments, an agglomeration of elongated fibers (optionally adhered using a binder), which can include pores positioned between the fibers.

In some embodiments, the porous support structure can be a "porous continuous" structure. A porous continuous structure, as used herein, refers to a continuous solid structure that contains pores within it, with relatively continuous surfaces between regions of the solid that define the pores. Examples of porous continuous structures include, for example, a piece of material that includes pores within its volume (e.g., a porous carbon particle, a metal foam, etc.). One of ordinary skill in the art will be capable of differentiating between a porous continuous structure and, for example, a structure which is not a porous continuous structure but which is a porous agglomeration of discrete particles (where the interstices and/or other voids between the discrete particles would be considered pores) by, for example, comparing SEM images of the two structures.

As used herein, a "pore" refers to a pore as measured using ASTM Standard Test D4284-07, and generally refers to a conduit, void, or passageway, at least a portion of which is surrounded by the medium in which the pore is formed. Generally, voids within a material that are completely surrounded by the material (and thus, not accessible from outside the material, e.g. closed cells) are not considered pores within the context of the invention. It should be understood that, in cases where the article comprises an agglomeration of particles, pores include both the interparticle pores (i.e., those pores defined between particles when they are packed together, e.g. interstices) and intraparticle pores (i.e., those pores lying within the envelopes of the individual particles). Pores may comprise any suitable cross-sectional shape including irregular shapes and regular shapes (e.g., substantially circular shapes, substantially elliptical shapes, substantially polygonal shapes, and the like).

In certain embodiments, the first porous support structure can include components with a first geometry while the second porous support structure can include components having a second geometry that is different from the first geometry. As one particular example, the relatively large-scale porous support structure can comprise an assembly of elongated fibers, and the relatively small-scale porous support structure can comprise a plurality of porous particles, the pores of which can at least partially contain an electrode active material. The porous particles containing the electrode active material can be coated on, injected into, or otherwise positioned within the interstices of the elongated fibers.

FIG. 1 is an exemplary cross-sectional schematic illustration of an electrode comprising a first porous support structure comprising components of a first geometry, and a second porous support structure comprising components of a second geometry that is different from the first geometry. In FIG. 1, electrode 100 comprises a large-scale porous support structure 102 comprising a plurality of elongated fibers 104 and pores 106 between fibers 104. Referring back to FIG. 1, electrode 100 also comprises a small-scale porous support structure 108 comprising a plurality of particles 110 positioned at least partially within pores 106 of porous support structure 102. Second porous support structure 108 can also comprise a plurality of pores. For example, the pores within porous support structure 108 can correspond to the spaces between the particles (e.g., interstices formed between the particles), in some embodiments. In certain embodiments, particles 110 can be porous, and the pores within the particles can contribute to the porosity of porous support structure 108. In certain embodiments in which particles 110 are porous, the particles themselves can constitute porous support structures (e.g., porous continuous support structures).

Figure 2:
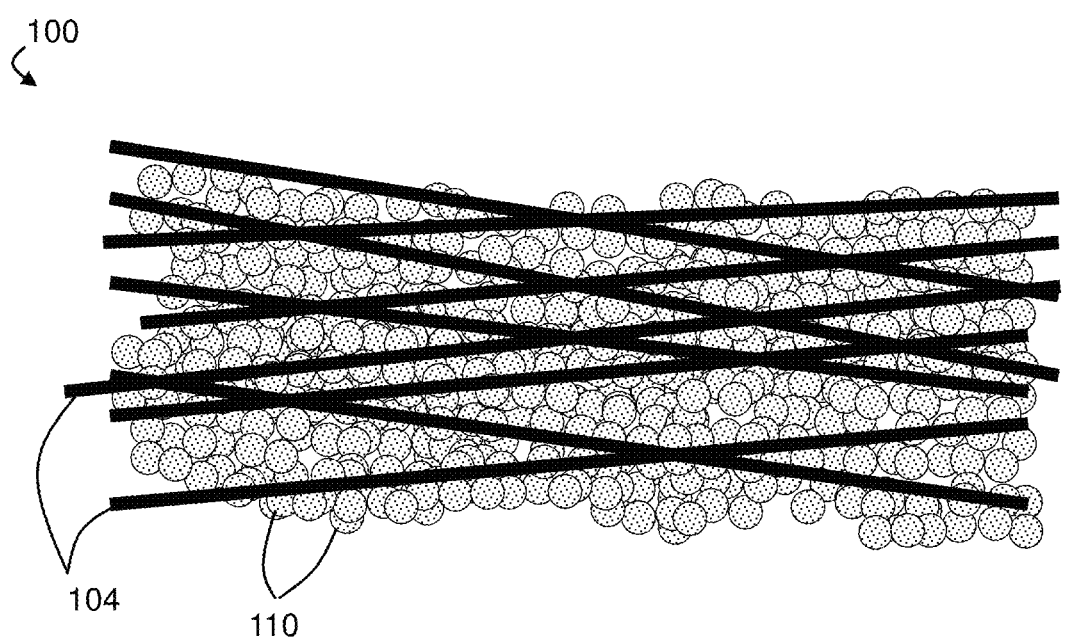
FIG. 2 is, according to certain embodiments, an exemplary cross-sectional schematic illustration of an electrode.

While porous support structure 108 occupies only a portion of the pores of porous support structure 102 in FIG. 1, it should be understood that the arrangement shown in FIG. 1 illustrates only an exemplary embodiment, and in other embodiments, porous support structure 108 can be distributed substantially evenly throughout the pores of porous support structure 102, as illustrated in FIG. 2.

Accordingly, as illustrated in FIGS. 1-2, electrode 100 includes an assembly of elongated fibers 104 and an assembly of particles 110 contained within the assembly of elongated fibers. In addition, electrode 100 can include an electrode active material contained within the assembly of particles 110, as discussed in more detail below.

Figure 3:
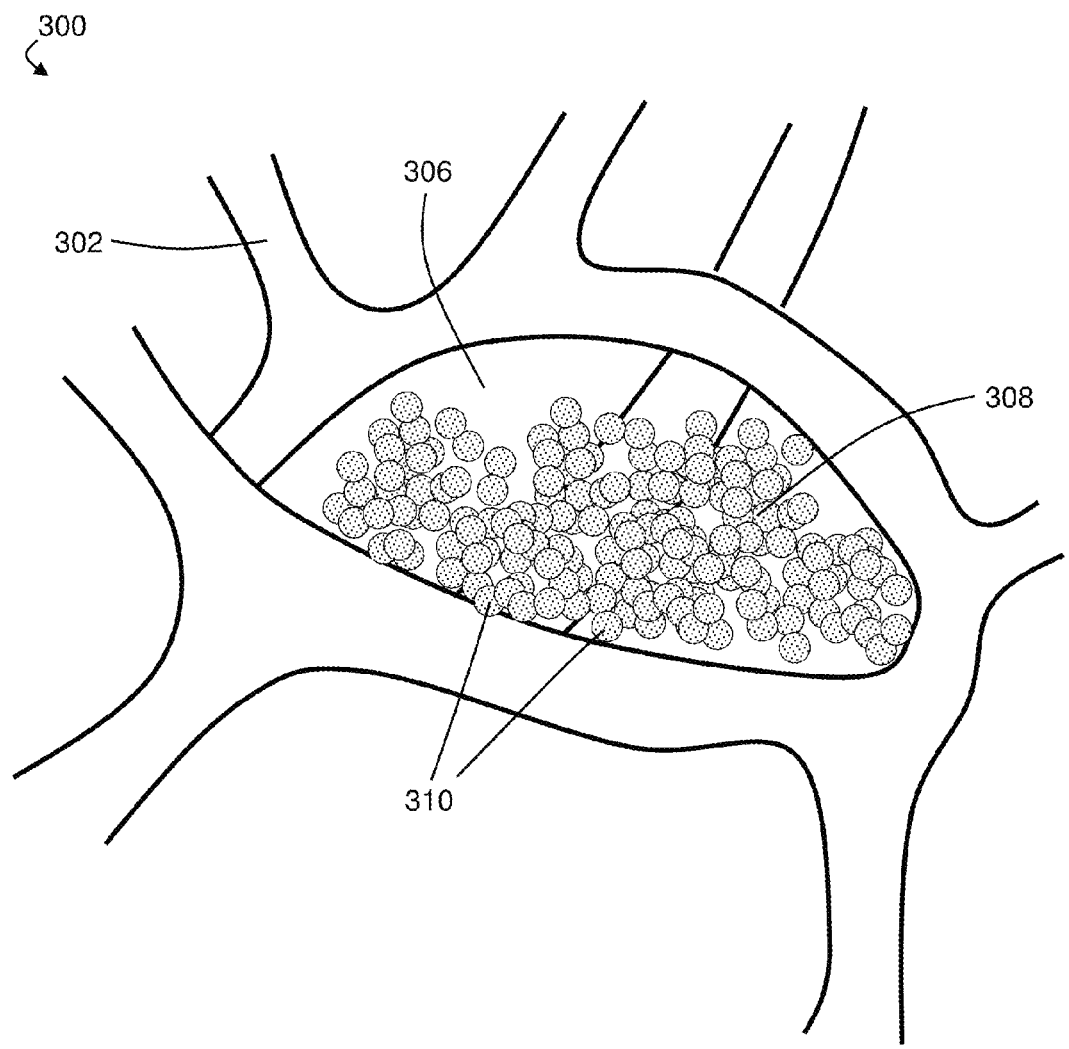
FIG. 3 is an exemplary schematic illustration of a portion of an electrode, according to some embodiments.

While the first porous support structure 102 comprises an assembly of elongated fibers and second porous support structure 108 comprises an assembly of particles in FIGS. 1-2, it should be understood that any suitable porous support structures can be employed. For example, FIG. 3 is a cross-sectional schematic illustration of a portion 300 of an electrode comprising a first porous support structure 302 and a second porous support structure 308 within pore 306 of porous support structure 302. In the set of embodiments illustrated in FIG. 3, first porous support structure 302 comprises a porous continuous structure (e.g., a metal foam, an aggregation of sintered or melted particles, etc.) while second porous support structure 308 comprises an assembly of particles 310.

In other embodiments, the first and/or second porous support structures can assume other forms. For example, in some embodiments, both the first and the second porous support structures can comprise particles, for example, with the particles of the first porous support structure deposited at least partially within the pores of the particles of the second porous support structure. One of ordinary skill in the art, given the present disclosure would be able to design a variety of other configurations including first and second porous support structures.

In certain embodiments, an electrode active material is at least partially contained within the pores of the small-scale and/or large-scale porous support structure. For example, in the set of embodiments illustrated in FIG. 1, an electrode active material can be contained within the spaces 112 between particles 110 and/or within the pores of particles 110, for example, when particles 110 comprise porous particles. In the set of embodiments illustrated in FIG. 3, electrode active material can be contained within the spaces between particles 310 and/or within the pores of particles 310, in cases where particles 310 are porous. In some embodiments, the electrodes described herein may include a relatively large amount of electrode active material. For example, in some embodiments, the electrode (e.g., cathode) may contain at least about 20 wt %, at least about 35 wt %, at least about 50 wt %, at least about 65 wt %, or at least about 75 wt % electrode active material (and, in certain embodiments, less than about 90 wt % electrode active material). A variety of electrode active materials can be used in association with the electrodes described herein, as described in more detail below.

As noted above with respect to FIGS. 1-2, a porous support structure (e.g., the large-scale porous support structure) can comprise an assembly of elongated fibers. The use of elongated fibers (e.g., within the relatively large-scale porous support structure) can be particularly advantageous in certain embodiments, as the presence of highly directional components of a porous support structure can enhance the degree to which electricity is conducted along the lengths of those components. For example, when elongated fibers are used to form the large-scale porous support structure, the longitudinal axes of a portion (e.g., at least about 10%, at least about 25%) of the fibers can be substantially aligned in certain embodiments, which can enhance the electronic conductivity of the porous support structure in the direction of alignment.

Elongated fibers within a porous support structure can have any suitable aspect ratio. For example, in certain embodiments, elongated fibers within a porous support structure can have aspect ratios of at least about 3:1, at least about 5:1, at least about 10:1, at least about 50:1; at least about 100:1, or greater (and/or, in some embodiments, less than about $10^9$:1). Elongated fibers within a porous support structure can have any suitable cross-section. For example, in certain embodiments, the elongated structures within a porous support structure have substantially circular, substantially elliptical, substantially square, polygonal, or irregular cross-sectional shapes.

In some embodiments in which elongated fibers are used within a porous support structure (e.g., a large-scale porous support structure), the fibers can have a smallest cross-sectional dimension of at least about 1 micron, at least about 5 microns, or at least about 10 microns. As used herein, the "smallest cross-sectional dimension" of a structure refers to the smallest distance between two opposed boundaries of an individual structure that may be measured. In some embodiments, the average of the smallest cross-sectional dimensions of the plurality of fibers can be at least about 1 micron, at least about 5 microns, or at least about 10 microns. The "average of the smallest cross-sectional dimensions" of a plurality of structures refers to the number average.

In certain embodiments, a porous support structure can comprise an article (e.g., a porous continuous structure) or assembly of components (e.g., an assembly of elongated fibers) wherein the article or assembly has one relatively thin dimension relative to the other two, such as, for example, a film, a sheet, or a mat. For example, in certain embodiments, a porous support structure (e.g., a large-scale porous support structure) can comprise an article or assembly with a thickness of less than about 10 mm, less than about 1 mm, less than about 500 micrometers, or less than about 100 micrometers (and/or a thickness of at least about 1 micrometer and/or at least about 10 micrometers). In certain cases, the porous support structure can comprise a first dimension orthogonal to the thickness that is at least about 100, at least about 1000, or at least about 10,000 times greater (and, in some instances, less than about $10^9$ times greater) than the thickness. In some embodiments, the porous support structure can comprise a second dimension that is orthogonal to both the thickness and the first orthogonal dimension and is at least about 100, at least about 1000, or at least about 10,000 times greater (and, in some instances, less than about $10^9$ times greater) than the thickness. In some cases, the morphology of a porous support structure may be selected such that the support structure can be relatively easily integrated into an electrochemical cell for use as, for example, an electrode. For example, the support structure may comprise a film, sheet, or mat upon which additional components of an electrochemical cell (e.g., an electrolyte, another electrode, etc.) can be assembled.

As one particular example, in certain embodiments, a porous support structure (e.g., a large-scale porous support structure) can comprise a mat of elongated carbon fibers.

In some embodiments, a porous support structure (e.g., the large-scale porous support structure) can comprise a cohesive structure. Generally, cohesive structures are structures that can be bent, moved, or otherwise manipulated without falling apart. The components of a cohesive structure can be held together by forces stronger than van der Waals forces. For example, in certain embodiments, the components of the cohesive structure can be held together by covalent bonds and/or by adhesive forces (e.g., using a binder). Examples of such cohesive structures include, for example, foams (e.g., metal foams), sintered assemblies, adhesive-based assemblies (e.g., mats comprising a binder), and the like.

In certain embodiments, a porous support structure (e.g., the relatively small-scale porous support structure located within the pores of the relatively large-scale porous support structure) can comprise an assembly of components (e.g., particles) with relatively short aspect ratios. For example, in certain embodiments, a porous support structure can comprise components with maximum aspect ratios of less than about 3, less than about 2, or less than about 1.5. As used herein, the maximum aspect ratio of a structure is calculated by dividing the maximum cross-sectional dimension of the structure by the longest cross-sectional dimension that is orthogonal to the maximum cross-sectional dimension of the structure. In certain embodiments, a porous support structure (e.g., the small-scale porous support structure) can comprise an assembly of particles with any suitable shape (e.g., substantially ellipsoidal particles, substantially spherical particles, substantially cubic particles, or particles of any other desired shape).

The terms "large-scale porous support structure" and "small-scale porous support structure" are used throughout to generally indicate the relative size of the pores of the porous support structures within the electrodes described herein. Generally, the large-scale porous support structures include pores that are sufficiently large to contain one or more small-scale porous support structures. For example, when a first porous support structure is contained within the pores of a second porous support structure, the first porous support structure can be referred to as the small-scale porous support structure (and/or the relatively small-scale porous support structure) and the second porous support structure can be referred to as the large-scale porous support structure (and/or the relatively large-scale porous support structure).

The distribution of the cross-sectional diameters of the pores within a given porous support structure and/or within the assembled electrode can be chosen to enhance the performance of the electrochemical cell. As used herein, the "cross-sectional diameter" of a pore refers to a cross-sectional diameter as measured using ASTM Standard Test D4284-07, which is incorporated herein by reference in its entirety. The "average cross-sectional diameter" of a plurality of pores refers to the number average of the cross-sectional diameters of each of the plurality of pores. One of ordinary skill in the art would be capable of calculating the distribution of cross-sectional diameters and the average cross-sectional diameter of the pores within a porous structure (e.g., a small-scale porous support structure, a large scale porous support structure, and electrode assembled from a combination of porous support structures) using mercury intrusion porosimetry as described in ASTM Standard Test D4284-07. For example, the methods described in ASTM Standard Test D4284-07 can be used to produce a distribution of pore sizes plotted as the cumulative intruded pore volume as a function of pore diameter. To calculate the percentage of the total pore volume within the sample that is occupied by pores within a given range of pore diameters, one would: (1) calculate the area under the curve that spans the given range over the x-axis, (2) divide the area calculated in step (1) by the total area under the curve, and (3) multiply by 100%. Optionally, in cases where the article includes pore sizes that lie outside the range of pore sizes that can be accurately measured using ASTM Standard Test D4284-07, porosimetry measurements may be supplemented using Brunauer-Emmett-Teller (BET) surface analysis, as described, for example, in S. Brunauer, P. H. Emmett, and E. Teller, *J. Am. Chem. Soc.*, 1938, 60, 309, which is incorporated herein by reference in its entirety.

In certain embodiments, a porous support structure and/or an assembled electrode can be configured to comprise pores with cross-sectional diameters that are larger than sub-nanometer scale and single nanometer scale pores, which can become clogged and/or can be too small to allow for the passage of electrolyte (e.g., liquid electrolyte) into the pores of the electrode due to, for example, capillary forces. As one particular example, in certain embodiments in which sulfur is used as a cathode active material, $Li_2S$ can be formed, which can clog the pores of the electrode if the pores are too small. In addition, in some cases, the pores within a porous support structure and/or within an assembled electrode may have cross-sectional diameters that are smaller than millimeter-scale pores, which may be so large that they render the electrode mechanically unstable.

In some embodiments, the total pore volume of a porous structure is described. In such embodiments, the porous support structure can be said to comprise a plurality of pores, wherein each pore of the plurality of pores has a pore volume, and the plurality of pores has a total pore volume defined by the sum of each of the individual pore volumes.

In certain embodiments, at least about 50%, at least about 75%, at least about 90%, at least about 99%, or substantially all of the total pore volume within the large-scale porous support structure is defined by pores having cross-sectional diameters that are at least about 10 micrometers, at least about 100 micrometers, at least about 1 millimeter, and/or less than about 10 millimeters (e.g., between about 10 micrometers and about 10 millimeters, between about 100 micrometers and about 10 millimeters, or between about 1 millimeter and about 10 millimeters). Generally, the porosity (e.g., distribution of pores, total pore volume, etc.) of a large scale porous support structure is determined in the absence of materials within the pores of the large-scale porous support structure. This can be achieved, for example, by removing the material (e.g., electrode active material, a small-scale porous support structure (e.g., an assembly of particles)) from the pores of the large-scale porous support structure and subsequently performing mercury intrusion porosimetry and/or by performing porosimetry before materials have been added to the large-scale porous support structure.

In certain embodiments, at least about 50%, at least about 75%, at least about 90%, at least about 99%, or substantially all of the total pore volume in the small-scale porous support structure is defined by pores having cross-sectional diameters of at least about 0.1 micrometers, at least about 1 micrometer, less than about 10 micrometers, and/or less than about 3 micrometers (e.g., between about 0.1 micrometers and about 10 micrometers, between about 0.1 micrometers and about 3 micrometers, between about 1 micrometer and about 10 micrometers, or between about 1 micrometers and about 3 micrometers). Generally, the porosity of a small-scale porous support structure is determined in the absence of materials within the pores of the small-scale porous support structure. This can be achieved, for example, by removing the material (e.g., electrode active material) from the pores of the small-scale porous support structure and subsequently performing mercury intrusion porosimetry and/or by performing porosimetry before materials have been added to the small-scale porous support structure.

In certain embodiments, at least about 50%, at least about 75%, at least about 90%, at least about 99%, or substantially all of the total pore volume within the large-scale porous support structure is occupied by pores having cross-sectional diameters that are at least about 10 times, at least about 100 times, at least about 1000 times, less than about $10^6$ times, less than about $10^5$ times, and/or less than about $10^4$ times (e.g., between about 10 times and about $10^6$ times, or between about 10 times and about $10^5$ times or any combination of ranges in this paragraph) larger than any subset of pores occupying at least about 50%, at least about 75%, at least about 90%, at least about 99%, or substantially all of the total pore volume within the small-scale porous support structure. In certain embodiments, the average pore-size within the large-scale porous support structure is at least about 10 times, at least about 100 times, at least about 1000 times, less than about $10^6$ times, less than about $10^5$ times, and/or less than about $10^4$ times (e.g., between about 10 times and about $10^6$ times, or between about 10 times and about $10^5$ times or any combination of ranges in this paragraph) larger than the average pore size within the small-scale porous support structure.

In certain embodiments, at least about 50%, at least about 75%, at least about 90%, at least about 99%, or substantially all of the total pore volume within the electrode, in the absence of the electrode active material, is defined by pores having cross-sectional diameters of at least about 0.1 micrometers, at least about 1 micrometer, less than about 10 micrometers, and/or less than about 3 micrometers (e.g., between about 0.1 micrometers and about 10 micrometers, between about 0.1 micrometers and about 3 micrometers, between about 1 micrometer and about 10 micrometers, or between about 1 micrometers and about 3 micrometers). In this context, the porosity is determined by measuring the porosity within the electrode support structure material (e.g., the large-scale porous support structure, the small-scale porous support structure contained within the pores of the large-scale porous support structure, any other additional support structures, any binder used to assemble the porous support structures, etc.) when the electrode active material is absent from the electrode. This can be achieved, for example, by removing the electrode active material from an assembled electrode and subsequently performing mercury intrusion porosimetry and/or by performing porosimetry after the electrode support structures have been assembled but before electrode active material has been added.

The average cross-sectional diameters of the pores within the large-scale porous support structure, the small-scale porous support structure, and/or the assembled electrode can fall within any of the aforementioned ranges, in certain embodiments. For example, in some embodiments, the average cross-sectional diameter of the pores within the large-scale porous support structure is at least about 10 micrometers, at least about 100 micrometers, at least about 1 millimeter, and/or less than about 10 millimeters (e.g., between about 10 micrometers and about 10 millimeters, between about 100 micrometers and about 10 millimeters, or between about 1 millimeter and about 10 millimeters). In certain embodiments, the average cross-sectional diameter of the pores within the small-scale porous support structure is at least about 0.1 micrometers, at least about 1 micrometer, less than about 10 micrometers, and/or less than about 3 micrometers (e.g., between about 0.1 micrometers and about 10 micrometers, between about 0.1 micrometers and about 3 micrometers, between about 1 micrometer and about 10 micrometers, or between about 1 micrometers and about 3 micrometers). In certain embodiments, the average cross-sectional diameter of the pores within the assembled electrode, excluding the electrode active material (i.e., including the large-scale porous support structure, the small-scale porous support structure contained within the pores of the large-scale porous support structure, and any binder used to assemble the porous support structures) is at least about 0.1 micrometers, at least about 1 micrometer, less than about 10 micrometers, and/or less than about 3 micrometers (e.g., between about 0.1 micrometers and about 10 micrometers, between about 0.1 micrometers and about 3 micrometers, between about 1 micrometer and about 10 micrometers, or between about 1 micrometers and about 3 micrometers).

In some embodiments, a porous support structure and/or an assembled electrode may comprise pores with relatively uniform cross-sectional diameters. Not wishing to be bound by any theory, such uniformity may be useful in maintaining relatively consistent structural stability throughout the bulk of the porous material. In addition, the ability to control the pore size to within a relatively narrow range can allow one to incorporate a large number of pores that are large enough to allow for fluid penetration (e.g., electrolyte penetration) while maintaining sufficiently small pores to preserve structural stability. In some embodiments, the distribution of the cross-sectional diameters of the pores within a porous support structure and/or within an assembled electrode can have a standard deviation of less than about 50%, less than about 25%, less than about 10%, less than about 5%, less than about 2%, or less than about 1% of the average cross-sectional diameter of the plurality of pores. Standard deviation (lowercase sigma) is given its normal meaning in the art, and can be calculated as:

$$\sigma = \sqrt{\frac{\sum_{i=1}^{n}(D_i - D_{avg})^2}{n-1}}$$

wherein $D_i$ is the cross-sectional diameter of pore i, $D_{avg}$ is the average of the cross-sectional diameters of the plurality of pores, and n is the number of pores. The percentage comparisons between the standard deviation and the average cross-sectional diameters of the pores outlined above can be obtained by dividing the standard deviation by the average and multiplying by 100%.

A variety of materials (e.g., in particle form, in melt form, or other forms mentioned herein) can be used to form the porous support structure. In certain embodiments, a porous support structure (e.g., a large-scale porous support structure and/or a small-scale porous support structure) can be electrically conductive. For example, in the set of embodiments illustrated in FIGS. 1-2, porous support structure 102 can be electrically conductive. The term "electrically conductive" would be understood by those of ordinary skill in the art. In addition, one of ordinary skill in the art, given the present disclosure, would be capable of selecting electrically conductive materials that could be used to fabricate electrically conductive porous support structures. Exemplary electrically conductive materials that can be used to form all or part of a porous support structure include, but are not limited to, metals (e.g., nickel, copper, magnesium, aluminum, titanium, scandium, iron, alloys and/or other combinations of these), conductive polymers (poly(3,4-ethylenedioxythiphene) (PEDOT), poly(methylenedioxythiophene) (PMDOT), other thiophenes, polyaniline (PANI), polypyrrole (PPy)), carbon (e.g., carbon black, graphite or graphene, carbon fibers, etc.), conductive ceramics, and the like. In some embodiments, a metal or metal alloy within the porous support structure (e.g., forming all or part of the components of a porous support structure) can have a bulk density of less than about 9 g/cm$^3$ or less than about 5 g/cm$^3$. For example, all or part of the porous support structure can be formed from titanium, which has a bulk density of about 4.5 g/cm$^3$.

In certain embodiments, an electrically conductive porous support structure comprises a material with a bulk electrical resistivity of less than about 10$^{-3}$ ohm·m, less than about 10$^{-4}$ ohm·m, or less than about 10$^{-5}$ ohm·m at 20° C. For example, in some embodiments, all or part of the porous support structure can be formed of graphite, which has a bulk electrical resistivity of between about 2.5×10$^{-6}$ and about 5×10$^{-6}$ ohm·m at 20° C. and/or nickel, which has a bulk electrical resistivity of about 7×10$^{-8}$ ohm·m at 20° C. In certain embodiments, at least about 50 wt %, at least about 75 wt %, at least about 90 wt %, at least about 95 wt %, or at least about 99 wt % of the porous support structure is made up of material(s) having bulk electrical resistivities of less than about 10$^{-3}$ ohm·m or less than about 10$^{-6}$ ohm·m at 20° C.

In certain embodiments, the porous support structures described herein can have a surface resistivity of about 1×10$^5$ ohm/sq or less, about 1×10$^4$ ohm/sq or less, about 1×10$^3$ ohm/sq or less, about 100 ohm/sq or less, or about 10 ohm/sq or less. In some embodiments, the porous support structures described herein can have a volume resistivity of about 1×10$^4$ Ohm·cm or less, about 1×10$^3$ Ohm·cm or less, or about 500 Ohm·cm or less.

In some embodiments, the first and/or second porous support structures can comprise an electrically non-conductive material, such as a non-conductive polymer, a ceramic, a glass, a fabric, or any other suitable non-conductive material. The electrically non-conductive material can be, in certain embodiments, mixed with or at least partially coated with an electrically conductive material to impart the desired level of electrical conductivity. Suitable non-conductive polymers for use in forming porous support structures include, but are not limited to, polyvinyl alcohol (PVA), phenolic resins (novolac/resorcinol), lithium polystyrenesulfonate (LiPSS), epoxies, UHMWPE, PTFE, PVDF, PTFE/vinyl copolymers, co-polymers/block co-polymers of the above and others. In some embodiments, two polymers can be used for their unique funcionalities (e.g. PVA for adhesion, and LiPSS for rigidity, or resorcinol for rigidity and an elastomer for flexibility/toughness).

Suitable ceramics include, but are not limited to, oxides, nitrides, and/or oxynitrides of aluminum, silicon, zinc, tin, vanadium, zirconium, magnesium, indium, and alloys thereof. In some cases, the porous support structure can include any of the oxides, nitrides, and/or oxynitrides above doped to impart desirable properties, such as electrical conductivity; specific examples of such doped materials include tin oxide doped with indium and zinc oxide doped with aluminum. The material used to form the porous support structure can comprise glass (e.g., quartz, amorphous silica, chalcogenides, and/or other conductive glasses) in some embodiments. The porous support structure can include, in some cases, aerogels and/or xero gels of any of the above materials. In some cases, the porous support structure can include a vitreous ceramic.

In one particular set of embodiments, a porous support structure (e.g., a large-scale porous support structure) can comprise an assembly of fibers (e.g., polymeric fibers and/or carbon fibers) that are at least partially coated with a metal such as copper, nickel, and/or titanium, and the like. A porous support structure might also comprise an assembly of fibers comprising an electrically conductive material (e.g., carbon, a metal) within the bulk of the fiber. In certain embodiments, a porous support structure (e.g., the small-scale porous support structure) can comprise an assembly of carbon particles (e.g., porous carbon particles). In still other embodiments, a porous support structure can comprise a porous continuous structure comprising a metal, glass, ceramic, polymer, or any other suitable material, optionally coated with an electrically conductive material.

In some embodiments in which the bulk of the porous support structure is made of a material that is substantially electrically non-conductive, electrically conductive material can be deposited within the pores of the support structure (e.g., partially or completely coating the interior of the pores) to impart electrical conductivity. For example, the bulk of the porous support structure might comprise a ceramic (e.g., glass) or an electrically non-conductive polymer, and a metal might be deposited within the pores of the support structure.

The electrically conductive material can be deposited, for example, via electrochemical deposition, chemical vapor deposition, or physical vapor deposition. In some cases, after the deposition of the electrically conductive material, an electrode active material can be deposited within the pores of the porous support structure. Suitable materials for placement within the pores of the porous support structure to impart electrical conductivity include, but are not limited to carbon and metals such as nickel and copper, and combinations of these.

The bulk of a porous support structure can be made electrically conductive, in some embodiments, by incorporating one or more electrically conductive materials into the bulk of the porous support structure material. For example, carbon (e.g., carbon black, graphite or graphene, carbon fibers, etc.), metal particles, or other electrically conductive materials might be incorporated into a melt (e.g., a non-conductive polymeric melt, a glass melt, etc.) which is used to form a polymeric porous support structure to impart electrical conductivity to the porous support structure. After the melt is hardened, the electrically conductive material can be included within the bulk of the porous support structure.

The mechanical properties of the porous support structure can also be enhanced by incorporating materials that structurally reinforce the porous support structure into the bulk of the porous support structure. For example, carbon fibers and/or particulate fillers can be incorporated into a melt (e.g., a metallic melt, a glass melt, a polymeric melt, etc.) which is hardened to form a porous support structure. In some cases, carbon fibers and/or particulate fillers can be incorporated into a solution in which the porous support structure is formed (e.g., in some cases in which the porous support structure comprises a polymer).

A variety of electrode active materials can be used in association with the electrodes described herein. In certain embodiments (e.g., in some embodiments in which the electrode is used as a cathode), the electrode active material within the pores can comprise sulfur. For example, the electrode active material within the pores can comprise electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least about 40 wt % sulfur. In some cases, the electroactive sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al. of the common assignee, and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

While sulfur, as the cathode active species, is described predominately, it is to be understood that wherever sulfur is described as a component of the electrode active material herein, any suitable cathode active species may be used. For example, in certain embodiments, the cathode active species comprises a hydrogen-absorbing alloy, such as those commonly used in nickel metal hydride batteries. One of ordinary skill in the art, given the present disclosure, would be capable of extending the ideas described herein to electrochemical cells containing electrodes employing other cathode active materials.

The anodes described herein may include a variety of anode active materials. In certain embodiments, the anode active material comprises an alkali metal (e.g., lithium, sodium, potassium, rubidium, caesium, francium) and/or an alkaline earth metal (e.g., beryllium, magnesium, calcium, strontium, barium, radium). Suitable electrode active materials for use in an anode of the electrochemical cells described herein include, but are not limited to, lithium metal such as lithium foil and lithium deposited onto a conductive substrate, and lithium alloys (e.g., lithium-aluminum alloys and lithium-tin alloys). While these are preferred negative electrode materials, other cell chemistries may also be used. In some embodiments, the anode may comprise one or more binder materials (e.g., polymers, etc.). In some embodiments, an electroactive lithium-containing material of an anode active layer comprises greater than 50 wt % lithium. In some cases, the electroactive lithium-containing material of an anode active layer comprises greater than 75 wt % lithium. In still other embodiments, the electroactive lithium-containing material of an anode active layer comprises greater than 90 wt % lithium.

The electrodes comprising one or more porous support structures may comprise a relatively high percentage of electrode active material (e.g., sulfur), in some embodiments. In certain embodiments, for example, the electrode may contain electrode active material in an amount of at least about 20 wt %, at least about 30 wt %, at least about 40 wt %, or more. It should be understood that, for the purposes of calculating the amount of electrode active material within an electrode, only the weight of the electrode active species is counted. For example, in cases where electroactive sulfur-containing materials such as polysilfides or organic materials comprising sulfur, only the sulfur content of the electroactive sulfur-containing materials is counted in determining the percentage of electrode active material within the electrode. In some embodiments, the electrodes comprising the porous support structure can comprise at least about 20 wt %, at least about 30 wt %, at least about 40 wt %, or more sulfur.

The electrodes described herein can comprise relatively high weight ratios of electrode active material to support material. The ratio of electrode active material to support material is generally calculated by dividing the mass of the electrode active species (as determined per the preceding paragraph) by the mass of the support material. As one example, when a sulfur-containing electrode active material is deposited within an electrode comprising carbon fibers and/or carbon particles as support material(s), the electrode may comprise a relatively high ratio of sulfur to carbon. In certain embodiments, the ratio of electrode active material to support material (e.g., ratio of sulfur to support material) within the electrodes described herein can be at least about 1:1, at least about 2:1, at least about 3:1, at least about 4:1, at least about 5:1, or at least about 6:1 (and, in certain cases, of less than about 10:1).

In some embodiments, the electrodes described herein can comprise a relatively large electrolyte accessible conductive material area. As used herein, "electrolyte accessible conductive material area" is used to refer to the total surface area of the electrically conductive material (e.g., the surface area of the conductive support material (e.g., metal, carbon, etc.), whether present in the bulk of the support material or coated onto the support material) within the electrode that can be contacted by electrolyte. For example, electrolyte accessible conductive material area may comprise conductive material surface area within the pores of the electrode, conductive material surface area on the external surface of the electrode, etc. Electrolyte accessible conductive material area is generally not obstructed by binder or other materials. In addition, in some embodiments, electrolyte accessible conductive material area does not include portions of the conductive material that reside within pores that restrict electrolyte flow due to surface tension effects. In some cases, the electrode comprises an electrolyte accessible conductive material area (e.g., an electrolyte accessible carbon area, an electrolyte accessible metal area) of at least about 1 $m^2$, at least about 5 $m^2$, at least about 10 $m^2$, at least about 20 $m^2$, at least about 50 $m^2$, or at least about 100 $m^2$ per gram of electrode active material (e.g., sulfur) in the electrode. The relatively large electrolyte accessible conductive material areas described above can be achieved, in some cases, while an anisotropic force (e.g., with a component normal to an active surface of an electrode and defining a pressure of between about 20 Newtons/$cm^2$ and about 200 Newtons/$cm^2$, or within any of the ranges outlined herein) is applied to the electrochemical cell. The electrolyte accessible conductive material area can be measured, for example, using mercury intrusion porosimetry, optionally with BET surface analysis.

Electrode active material (e.g., particles, films, or other forms comprising electrode active material) may be deposited within the pores of a porous support structure (e.g., a small-scale porous support structure and/or a large-scale porous support structure) via a variety of methods. In some embodiments, electrode active material is deposited by suspending or dissolving a particle precursor (e.g., a precursor salt, elemental precursor material such as elemental sulfur, and the like) in a solvent and exposing the porous support structure to the suspension or solution (e.g., via dipping the porous support structure into the solvent, by spraying the solvent into the pores of the porous support structure, and the like). The particle precursor may subsequently form particles within the pores of the support structure. For example, in some cases, the precursor may form crystals within the pores of the support structure. Any suitable solvent or suspension medium may be used in conjunction with such a technique including aqueous liquids, non-aqueous liquids, and mixtures thereof. Examples of suitable solvents or suspension media include, but are not limited to, water, methanol, ethanol, isopropanol, propanol, butanol, tetrahydrofuran, dimethoxyethane, acetone, toluene, xylene, acetonitrile, cyclohexane, and mixtures thereof. Of course, other suitable solvents or suspension media can also be used as needed.

Electrode active material can also be deposited within the pores of the support structure, in some cases, by heating a material above its melting point or boiling point (optionally adjusting the surrounding pressure to, for example, aid in evaporation). The heated material may then be flowed or vaporized into the pores of the support material such that particulate deposits or other solids are formed. As a specific example, elemental sulfur powder can be positioned next to a porous support material and heated above the melting point of sulfur, such that the sulfur flows into the pores of the material (e.g., via sublimation, via liquid flow). The composite can then be cooled such that the sulfur deposits within the pores.

In some embodiments, electrode active material can be deposited within the pores of the support structure via electrochemical deposition, chemical vapor deposition, or physical vapor deposition. For example, metals such as aluminum, nickel, iron, titanium, and the like, can be electrochemically deposited within the pores of a porous support structure. Alternatively, such materials may be deposited, for example, using a physical vapor deposition technique such as, for example, electron beam deposition.

In some embodiments, catalyst may be deposited within the pores of the support structure in addition to the electrode active material (e.g., before or during the deposition of the electrode active material). In some cases, the catalyst may catalyze the electrochemical conversion of the electrode active material (e.g., the conversion of sulfur to $Li_2S$ and/or the conversion of $Li_2S$ to sulfur). Suitable catalyst can include, for example, cobalt phthalocyanine and transition metal salts, complexes, and oxides (e.g., $Mg_{0.6}Ni_{0.4}O$).

As noted above, in certain embodiments, the electrode active material within a porous support structure can be in the form of particles. For example, in certain embodiments, particles comprising electrode active material can be positioned within a small-scale porous support structure. The particles comprising electrode active material can be of any suitable shape. For example, in some embodiments, the particles may be substantially spherical. In some cases, a particle can be similar in shape to the pore it occupies (e.g., cylindrical, prismatic, etc.).

The sizes of the particles comprising electrode active material can be selected to enhance the performance of the electrochemical cell. In some embodiments, each particle of the plurality of particles comprising electrode active material within the pores of a porous support structure (e.g., a small-scale porous support structure) has a particle volume, and the plurality of particles has a total particle volume defined by the sum of each of the individual particle volumes. In addition, in some embodiments, each particle of the plurality of particles comprising electrode active material within the pores of a porous support structure (e.g., a small-scale porous support structure) has a maximum cross-sectional dimension. In some instances, at least about 50%, at least about 70%, at least about 80%, at least about 90%, at least about 95%, at least about 99%, or substantially all of the total particle volume within the pores of a porous support structure (e.g., a small-scale porous support structure) is occupied by particles having maximum cross-sectional dimensions of between about 0.1 microns and about 10 microns. In some embodiments, at least about 50%, at least about 70%, at least about 80%, at least about 90%, at least about 95%, at least about 99%, or substantially all of the total particle volume within the pores of a porous support structure (e.g., a small-scale porous support structure) is occupied by particles having maximum cross-sectional dimensions of between about 1 micron and about 10 microns, or between about 1 micron and about 3 microns. Stated another way, in some embodiments, the plurality of particles comprising electrode active material together defines a total quantity of particulate material, and at least about 50% (or at least about 70%, at least about 80%, at least about 90%, at least about 95%, at least about 99%, or substantially all) of the total quantity of particulate material is made up of particles having maximum cross-sectional dimensions of between about 0.1 microns and about 10 microns (or between about 1 micron and about 10 microns, or between about 1 micron and about 3 microns).

As used herein, the "maximum cross-sectional dimension" of a particle refers to the largest distance between two opposed boundaries of an individual particle that may be measured. The "average maximum cross-sectional dimension" of a plurality of particles refers to the number average of the maximum cross-sectional dimensions of the plurality of particles. One of ordinary skill in the art would be capable of measuring the maximum cross-sectional dimension of a particle by, for example, analyzing a scanning electron micrograph (SEM) of a particle. In embodiments comprising agglomerated particles, the particles should be considered separately when determining the maximum cross-sectional dimensions. The measurement could be performed by establishing imaginary boundaries between each of the agglomerated particles, and measuring the maximum cross-sectional dimension of the hypothetical, individuated particles that result from establishing such boundaries. The distribution of maximum cross-sectional dimensions and particle volumes could also be determined by one of ordinary skill in the art using SEM analysis. The total particle volume of the particles within a set of pores could be determined by one of ordinary skill in the art by employing mercury intrusion porosimetry according to ASTM Standard Test D4284-07 (optionally with BET surface analysis) to measure the volume within the pores before and after the particles are disposed within the pores. When the material inside the pores of the support structure is itself porous, mercury intrusion porosimetry measurements (with optional BET surface analysis) may be supplemented with visual analysis of SEM micrographs to determine the volume occupied by the material (e.g., particles) within the pores.

In some embodiments, particles comprising the electrode active material within a porous support structure may have an average maximum cross-sectional dimension within a designated range. For example, in some cases, particles comprising electrode active material within a porous support structure can have an average maximum cross-sectional dimension of between about 0.1 microns and about 10 microns, between about 1 micron and about 10 microns, or between about 1 micron and about 3 microns. In some embodiments, the ratio of the average maximum cross-sectional dimension of the particles comprising electrode active material within a porous support structure to the average cross-sectional diameter of the pores within the porous support structure can be between about 0.001:1 and about 1:1, between about 0.01:1 and about 1:1, or between about 0.1:1.

In some embodiments, particles comprising electrode active material within the pores of a porous support structure can have relatively uniform maximum cross-sectional dimensions. Not wishing to be bound by any theory, such uniformity may be useful in producing relatively consistent performance along a surface of an electrode comprising electrode active material particles. In some embodiments, the distribution of the maximum cross-sectional dimensions of the particles within a porous support structure can have a standard deviation of less than about 50%, less than about 25%, less than about 10%, less than about 5%, less than about 2%, or less than about 1% of the average maximum cross-sectional dimensions of the plurality of particles. Standard deviation (lower-case sigma) is given its normal meaning in the art, and can be calculated, and expressed as a percentage relative to an average, as described above.

In some embodiments, the electrode active material (e.g., particles comprising electrode active material or other forms of electrode active material) within the pores of a porous support structure (e.g., a small-scale porous support structure) may occupy a relatively large percentage of the pore volume of the porous support structure. For example, in some embodiments, the material within a porous support structure (e.g., particles comprising an electrode active material) can occupy at least about 10%, at least about 20%, at least about 35%, at least about 50%, at least about 70%, or more of the accessible pore volume of the porous support structure. As used herein, the "accessible pore volume" is consistent with the above definition of a pore and refers to the percentage of the pore volume that is exposed to the external environment surrounding a porous article, as opposed to pore volume that is completely enclosed by the material forming the porous article. The volume occupied by material within the pores should be understood to include an imaginary volume that surrounds the outer boundaries of the material (e.g., particles) within the pores, which may include material (e.g. particle) void volume in cases where the material within the pores is itself porous. One of ordinary skill in the art is capable of calculating the percentage of accessible pore volume, for example, using mercury intrusion porosimetry measurements according to ASTM Standard Test D4284-07, optionally supplemented by BET surface analysis. The percentage of accessible pore volume within a porous article that is occupied by particles can be calculated, for example, by performing mercury intrusion porosimetry measurements (optionally with BET surface analysis) of the porous article before and after the particles are positioned within the pores. When the material inside the pores of the support structure is itself porous, mercury intrusion porosimetry measurements (with optional BET surface analysis) may be supplemented with visual analysis of SEM micrographs to determine the volume occupied by the material (e.g., particles) within the pores.

In some cases, the distribution of the electrode active material (e.g., sulfur within a cathode) can be relatively consistent across one or more surfaces of the electrode, or across any cross-section of the electrode. In some embodiments, at least about 50%, at least about 75%, at least about 85%, at least about 90%, at least about 95%, or at least about 98% of the area of the surface of an electrode (e.g., cathode) defines a uniform area that includes a uniform distribution of electrode active material (e.g., sulfur). In some embodiments, at least about 50%, at least about 75%, at least about 85%, at least about 90%, at least about 95%, or at least about 98% of the area of a surface of a cross-section substantially perpendicular to the thickness of an electrode (e.g., a cathode) defines a uniform area that includes a uniform distribution of electrode active material (e.g., sulfur).

In this context, a "surface of an electrode" refers to the geometric surface of the electrode, which will be understood by those of ordinary skill in the art to refer to the surface defining the outer boundaries of the electrode, for example, the area that may be measured by a macroscopic measuring tool (e.g., a ruler) and does not include the internal surface area (e.g., area within pores of a porous material such as a foam, or surface area of those fibers of a mesh that are contained within the mesh and do not define the outer boundary, etc.). In addition, a "cross-section of an electrode" defines an approximate plane viewed by cutting (actually or theoretically) the electrode to expose the portion one wishes to analyze. After the electrode has been cut to observe the cross-section, the "surface of the cross-section of the electrode" corresponds to the exposed geometric surface. Stated another way, "surface of an electrode" and "surface of the cross-section of the electrode" refer, respectively, to the geometric surface of the electrode and the geometric surface of a cross-section of the electrode.

In some embodiments, an electrode active material (e.g., sulfur) is uniformly distributed when any continuous area that covers about 10%, about 5%, about 2%, or about 1% of the uniform area (described in the preceding paragraphs) includes an average concentration of the electrode active material (e.g., sulfur) that varies by less than about 25%, less than about 10%, less than about 5%, less than about 2%, or less than about 1% relative to the average concentration of the electrode active material (e.g., sulfur) across the entirety of the uniform area. In this context, the "average concentration" of an electrode active material refers to the percentage of the surface area of the electrode (e.g., exposed surface area, surface area of a cross section of the electrode) that is occupied by electrode active material when the electrode is viewed from an angle substantially perpendicularly to the electrode.

One of ordinary skill in the art would be capable of calculating average electrode active material concentrations within a surface or a cross-section of an electrode, and the variance in concentrations, by analyzing, for example, X-ray spectral images of an electrode surface or cross-section. For example, one could obtain an x-ray spectral image of an electrode surface or cross-section (e.g., by physically slicing the electrode to produce the cross-section), such as the images shown in FIG. 9. To calculate the average concentration of sulfur over a given area in such an image, one would determine the percentage of the image that is occupied by the color corresponding to sulfur over that area. To determine whether the average concentration within a sub-area varies by more than X % relative to the average concentration within a larger area, one would use the following formula:

$$\text{Variance}(\%) = \left| \frac{C_L - C_{sub}}{C_L} \right| \cdot 100\%$$

wherein $C_L$ is the average concentration within the larger area (expressed as a percentage), $C_{sub}$ is the average concentration within the sub-area (expressed as a percentage). As a specific example, if the average concentration of the electrode active material within a sub-area is 12%, and the average concentration of the electrode active material within a larger area is 20%, the variance would be 40%.

Stated another way, in some embodiments, at least about 50% (or at least about 75%, at least about 85%, at least about 90%, at least about 95%, or at least about 98%) of the area of the surface of the electrode (or of a cross-section of the electrode) defines a first, continuous area of essentially uniform sulfur distribution, the first area having a first average concentration of sulfur. In some cases, any continuous area that covers about 10% (or about 5%, about 2%, or about 1%) of the first, continuous area of the surface of the electrode (or of the cross section of the electrode) includes a second average concentration of sulfur that varies by less than about 25% (or less than about 10%, less than about 5%, less than about 2%, or less than about 1%) relative to the first average concentration of sulfur across the first, continuous area.

In some embodiments, a method of making an electrode for use in an electrochemical cell is described. The method may comprise, in some embodiments, depositing an electrode active material within the pores of a first porous support structure. In certain embodiments, a first porous support structure can be deposited in the pores of a second, electrically conductive porous support structure. In certain embodiments, the electrode active material is deposited within the pores of the first porous support structure before the first porous support structure is deposited within the pores of the second porous support structure. In some embodiments, the first porous support structure is deposited within the pores of the second porous support structure before the electrode active material is deposited within the pores of the first porous support structure.

Porous support structures (and resulting electrodes) can be fabricated using a variety of suitable methods. For example, in some embodiments, components of a porous support structure (e.g., particles, elongated fibers, etc.) can be suspended in a fluid, and the fluid can be subsequently removed (e.g., via heat drying, vacuum drying, filtration, etc.) to produce the porous support structure in which the components are adhered or otherwise interconnected to form an assembly. As mentioned above, in some cases, a binder can be used to adhere particles to form a composite porous support structure.

In some embodiments, porous support structures can be fabricated by heating individual components until the components are altered to form a porous support structure (e.g., a porous continuous structure). In some embodiments, components (e.g., metallic components, ceramic components, glass components, etc.) can be arranged such that they are in contact with each other, with interstices located between the components. The components can then be sintered to form a fused structure in which the interstices between the components constitute the pores in the sintered structure. As used herein, "sintering" is given its normal meaning in the art, and is used to refer to a method for making objects from components (e.g., particles, fibers, etc.), by heating the components to a temperature below their melting point until the particles fuse to each other. The total porosity, size of the pores, and other properties of the final structure can be controlled by selecting appropriate component sizes and shapes, arranging the components to form a desired packing density prior to sintering, and/or selecting appropriate sintering conditions (e.g., heating time, temperature, etc.).

In some cases, components (e.g., polymeric components, metallic components, glass components, ceramic components, etc.) arranged such that they are in contact with each other can be heated such that the components melt to form a porous continuous structure. The interstices of the original structure can form the pores of the resulting porous continuous structure in some such embodiments. The total porosity, size of the pores, and other properties of the final structure can be controlled by selecting appropriate component sizes and shapes, arranging the components to form a desired packing density prior to heating, and/or selecting appropriate heating conditions (e.g., heating time, temperature, etc.).

In some embodiments, components can be controllably arranged prior to drying, melting, and/or sintering. For example, in some cases in which components are used to form a porous layer, it can be advantageous to arrange the components such that they are distributed relatively evenly and relatively flatly against a substrate. This can be achieved, for example, by suspending the components in a solvent that is volatile (e.g., at room temperature), and pouring the solvent onto the substrate on which the porous structure is to be formed. After the component suspension is deposited, the volatile solvent can be allowed to evaporate, leaving behind a relatively well-ordered array of components.

The drying, sintering, or melting processes described herein can be carried out in a controlled atmosphere, in some cases. For example, the volume in which drying, melting, or sintering is performed can be filled with a relatively inert gas (e.g., nitrogen, argon, helium, and the like), in some cases. In some instances, the drying, melting, or sintering can be carried out in the substantial absence of oxygen, which can reduce or eliminate oxidation and/or combustion of the material used to form the porous support structure. In some embodiments, a reducing atmosphere (e.g., forming gas with the balance nitrogen and/or argon, hydrogen, or the like) can be used to reduce the final oxygen content of the dried, sintered, and/or melted article.

The drying, sintering, and/or melting temperature can be selected based upon the material being used to form the porous support structure. For example, when melting particles to form the porous support structure, the heating temperature can be selected such that it is above the melting temperature of the material from which the particles are made. One of ordinary skill in the art would be capable of selecting an appropriate sintering temperature, based upon the type of material being sintered. For example, suitable sintering temperatures for nickel might be between about 700° C. and about 950° C.

As mentioned above, the sizes and shapes of the components used to form the porous support structure can be selected to achieve a desired porosity. In some embodiments, the components can be substantially spherical, although particles with other cross-sectional shapes (e.g., ellipses, polygons (e.g., rectangles, triangles, squares, etc.), irregular, etc.) can also be used. The components can be relatively small (e.g., in the form of a powder), in some embodiments. For example, in some cases, at least about 50%, at least about 70%, at least about 80%, at least about 90%, at least about 95%, at least about 99%, or substantially all of the components have maximum cross-sectional dimensions of between about 0.5 microns and about 20 microns or between about 3 microns and about 5 microns. Such component sizes can be useful in producing porous support structures (e.g., small-scale porous support structures comprising an assembly of particles) with the advantageous porosity properties described elsewhere in this application.

In some embodiments, a porous support structure can be formed by combining a first material with a second material, and forming the pores of the support structure by removing one of the materials from the mixture. Removing one of the materials from the mixture can leave behind voids which ultimately form the pores of the porous support structure. In some cases, the structure of the non-removed material can be substantially maintained while one or more of the materials within the mixture is removed. For example, in some cases, the support structure material (e.g., a metal, ceramic, glass, polymer, etc. which might be melted) or a precursor to the support structure material (e.g., which might be converted to form the material of the porous support structure via, for example, a reaction (e.g., polymerization, precipitation, etc.)), can be mixed with a plurality of templating entities. The templating entities can be arranged such that they form an interconnected network within the support structure material or precursor. After the templating entities have been arranged within the support structure material, they can be removed from the support structure material to leave behind pores. The support structure material can be hardened before the templating entities are removed and/or during the removal of the templating entities. As used herein, the term "hardened" is used to refer to the process of substantially increasing the viscosity of a material, and is not necessarily limited to solidifying a material (although in one set of embodiments, a porous support structure material is hardened by converting it into a solid). A material can be hardened, for example, by gelling a liquid phase. In some instances, a material can be hardened using polymerization (e.g., IR- or UV-induced polymerization). In some cases, a material can being hardened can go through a phase change (e.g., reducing the temperature of a material below its freezing point or below its glass transition temperature). A material may also be hardened by removing a solvent from a solution, for example, by evaporation of a solvent phase, thereby leaving behind a solid phase material.

The templating entities can be of any suitable phase. In some cases, the templating entities can be solid particles. For example, the templating entities might comprise silica particles, which can be dissolved out of a porous structure using, for example, hydrofluoric acid. As another example, the templating entities might comprise ammonium bicarbonate, which can be removed by dissolving it in water. In some embodiments, the templating entities can comprise fluid (e.g., liquid and/or gas) bubbles.

The templating entities can also have any suitable shape, regular or irregular, including, but not limited to, spheres, cubes, pyramids, or a mixture of these and/or other shapes. The templating entities may also each be formed of any suitable size. In some embodiments, the templating entities may have an average maximum cross-sectional dimension roughly equivalent to the size of the desired pores within the porous support structure.

As a specific example, a metallic porous support structure can be fabricated using metal injection molding. In an exemplary process, a "green" of metal particles, binder, and templating entities can be formed into a suitable structure (e.g., a relatively thin sheet) via injection molding. As the green is heated, the metal particles can be melted or sintered together while the binder and templating entities can be burned off, leaving behind a series of pores.

Porous ceramic structures can also be produced using a templating methods. For example, in some cases, a ceramic foam can be produced by including ceramic particles and templating entities within a polyaphron solution (i.e., a bi-liquid foam). The resulting mixture can be used in a sol gel solution, which can form a stable emulsion with the use of, for example, appropriate surfactants. Once the gel has been hardened, the templating entities can be removed by heat treatment. The size of the polyaphrons can be controlled by varying the type and amount of the surfactants in the bi-liquid foam.

Templating methods can also be used to produce porous polymeric structures. For example, a plurality of solid particles might be dispersed within a monomer solution. After the monomer is polymerized to form a polymer, the solid particles can be selectively dissolved out of the mixture to leave behind a series of pores within the rest of the polymeric structure.

Another method that might be used to produce the porous support structures described herein includes 3D printing. 3D printing is known to those of ordinary skill in the art, and refers to a process by which a three dimensional object is created by shaping successive layers, which are adhered on top of each other to form the final object. 3D printing can be used with a variety of materials, including metals, polymers, ceramics, and others.

Figure 4A:
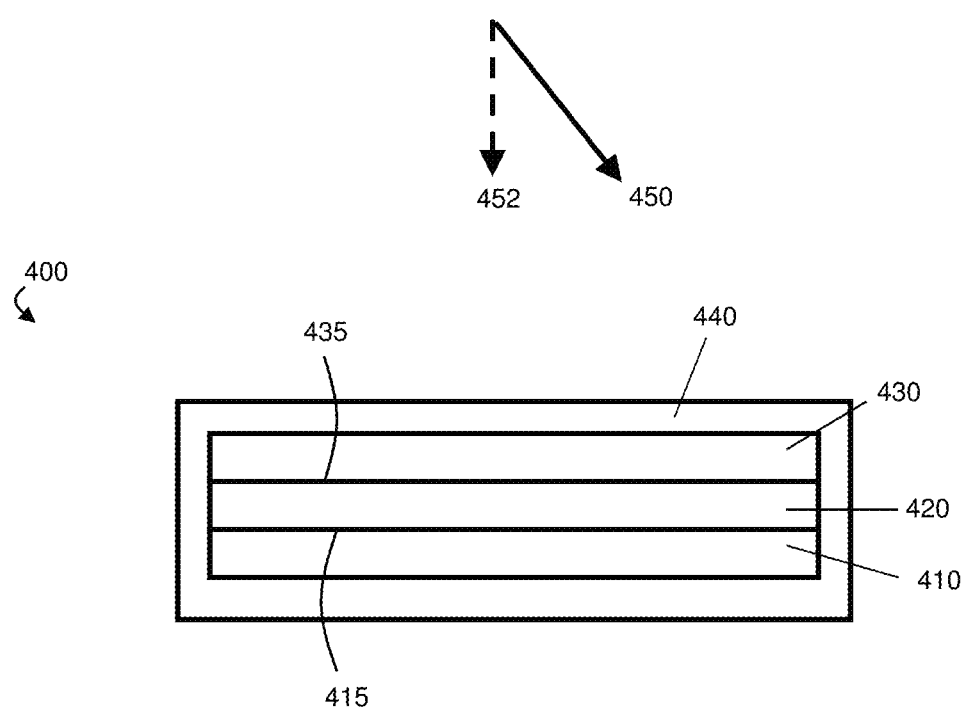
FIGS. 4A-4C are exemplary cross-sectional schematic illustrations of electrochemical cells, according to certain embodiments.

Although the electrodes described herein can find use in a wide variety of electrochemical devices, an example of one such device is provided in FIG. 4A for illustrative purposes only. In the embodiment shown in FIG. 4A, cell 400 includes a cathode 410, an anode 430, and an electrolyte 420 in electrochemical communication with the cathode and the anode.

In some cases, electrochemical cell 400 may also comprise containment structure 440. Containment structure 440 may comprise a variety of shapes including, but not limited to, cylinders, prisms (e.g., triangular prisms, rectangular prisms, etc.), cubes, or any other shape. A typical electrochemical cell might also include, for example, external circuitry, additional packaging, and the like. Those of ordinary skill in the art are well aware of the many arrangements that can be utilized with the general schematic arrangement as shown in the figures and described herein.

In electrochemical cell 400, the cathode and/or the anode can include a first porous support structure, a second porous support structure at least partially contained within the pores of the first porous support structure, and an electrode active material at least partially contained within the pores of the second porous support structure. In a lithium-sulfur electrochemical cell, the electrode active material in the cathode can comprise sulfur while the electrode active material within the anode can comprise lithium. In FIG. 4A, cathode 410 comprises active surface 415 while anode 430 comprises active surface 435.

In certain embodiments, the electrodes described herein can be operated in the absence of a separate current collector. This can be achieved, for example, by making electrical contact directly to the electrode, for example, by making electrical contact to a portion (or all) of the electrically conductive portion of the large-scale porous support structure within the electrode. Accordingly, in certain cases, external electric circuits may be directly connected to one or more electrodes (e.g., porous support structures within electrodes) in certain embodiments.

The components of electrochemical cell 400 may be assembled, in some cases, in a planar configuration. For example, in the embodiments illustrated in FIG. 4A, cathode 410 of electrochemical cell 400 is substantially planar. A substantially planar cathode can be formed, for example, by coating a slurry comprising particles and electrode active material onto a planar, large-scale porous support structure, such as an assembly of elongated fibers, a porous continuous structure (e.g., a metal foam), etc. In addition, in FIG. 4A, anode 430 is illustrated as being substantially planar. A substantially planar can be formed, for example, by forming a sheet of metallic lithium, by adding an anode slurry to a large-scale porous support structure, or by any other suitable method.

In certain embodiments, electrochemical cell 400 can comprise an electrode that comprises a metal such as an elemental metal and/or a metal alloy. As one particular example, in certain embodiments, electrochemical cell 400 can comprise an anode comprising elemental lithium (e.g., elemental lithium metal and/or a lithium alloy). In certain embodiments, the anisotropic force applied to the electrochemical cell is sufficiently large such that the application of the force affects the surface morphology of the metal within an electrode of the electrochemical cell, as described elsewhere herein.

Figure 4B:
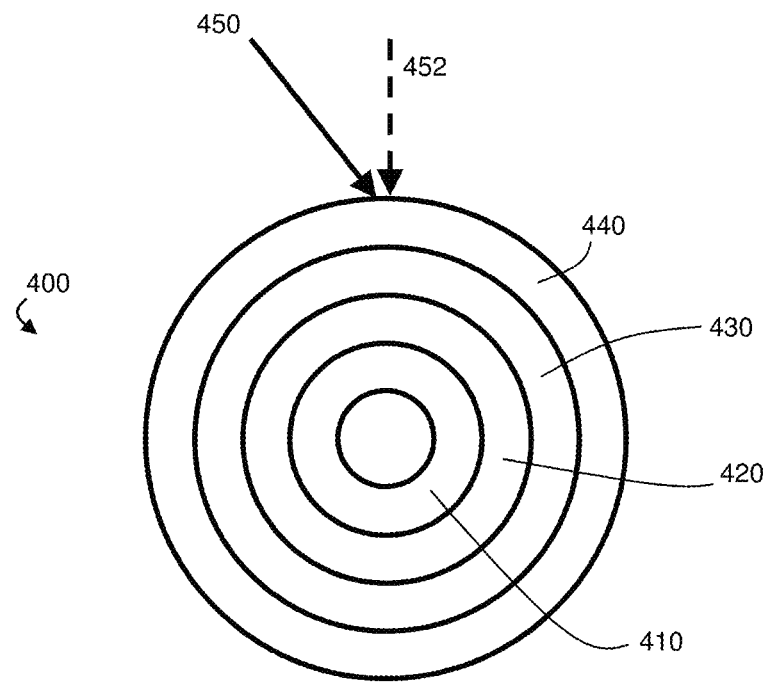
Figure 4C:
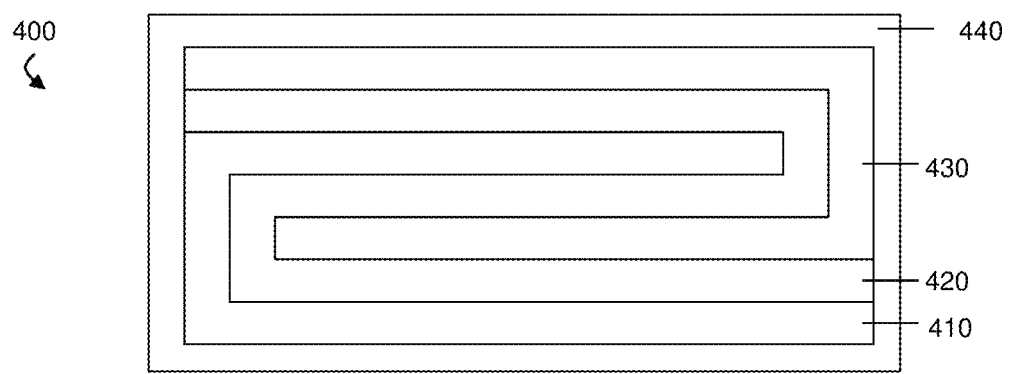

While FIG. 4A illustrates an electrochemical cell arranged in a planar configuration, it is to be understood that any electrochemical cell arrangement can be constructed, employing the principles of the present invention, in any configuration. For example, FIG. 4B is a cross-sectional schematic illustration of an electrochemical cell 400 arranged as a cylinder. FIG. 4C is a cross-sectional schematic illustration of an electrochemical cell 400 comprising a folded multi-layer structure. In addition to the shapes illustrated in FIGS. 4A-4C, the electrochemical cells described herein may be of any other shape including, but not limited to, prisms (e.g., triangular prisms, rectangular prisms, etc.), "Swiss-rolls," non-planar multi-layered structures, etc. Additional configurations are described in U.S. patent application Ser. No. 11/400,025, filed Apr. 6, 2006, entitled, "Electrode Protection in both Aqueous and Non-Aqueous Electrochemical Cells, including Rechargeable Lithium Batteries," to Affinito et al., which is incorporated herein by reference in its entirety.

In certain embodiments, the electrodes described herein can be configured for use in electrochemical cells in which an anisotropic force is applied to the cell. U.S. Patent Publication No. 2010/0035128 to Scordilis-Kelley et al. filed on Aug. 4, 2009, entitled "Application of Force in Electrochemical Cells," (which is incorporated herein by reference in its entirety for all purposes) describes the application of force in electrochemical cells for improved electrode chemistry, morphology, and/or other characteristics indicative of improved cell performance. Some electrochemical cells (e.g., rechargeable electrochemical cells) undergo a charge/discharge cycle involving deposition of metal (e.g., lithium metal or other active material) on a surface of an electrode (e.g., anode) upon charging and reaction of the metal on the electrode surface, wherein the metal diffuses from the anode surface, upon discharging. The uniformity with which the metal is deposited in such cells may affect cell performance. As one particular example, when lithium metal is removed from and/or redeposited on an anode, it may, in some cases, result in an uneven surface; for example, upon redeposition, lithium may deposit unevenly forming a rough surface. The roughened surface may increase the amount of lithium metal available for undesired chemical reactions which may result in decreased cycling lifetime and/or poor cell performance. The application of an anisotropic force with a component normal to an electrode active surface within the electrochemical cell has been found to reduce such behavior and to improve the cycling lifetime and/or performance of the cell.

Accordingly, in certain embodiments, the electrodes described herein can be configured to withstand an applied anisotropic force (e.g., a force applied to enhance the morphology of the other electrode). For example, in certain embodiments, the electrodes can be part of an electrochemical cell that is constructed and arranged to apply, during at least one period of time during charge and/or discharge of the cell, an anisotropic force with a component normal to the active surface of an electrode (e.g., an anode) of the electrochemical cell. In one set of embodiments, the applied force can be selected to enhance the morphology of an anode (e.g., a lithium metal anode), and the cathode (e.g., a cathode comprising sulfur as a cathode active material) can comprise multiple porous support structures in which the cathode active material is positioned.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

In certain such cases, the anisotropic force comprises a component normal to an active surface of an electrode within an electrochemical cell. As used herein, the term "active surface" is used to describe a surface of an electrode that is in physical contact with the electrolyte and at which electrochemical reactions may take place. One of ordinary skill in the art would understand that an active surface of an electrode refers to a geometric surface of the electrode, which will be understood by those of ordinary skill in the art to refer to a surface defined by the outer boundaries of the electrode, for example, the area that may be measured by a macroscopic measuring tool (e.g., a ruler), and does not include the internal surface area (e.g., area within pores of a porous material such as a foam, or surface area of those fibers of a mesh that are contained within the mesh and do not define the outer boundary, etc.).

A force with a "component normal" to a surface, for example an active surface of an electrode such as an anode, is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document.

Applied forces with components normal to active surfaces of electrode are illustrated in FIGS. 4A-4C. For example, referring to FIG. 4A, an anisotropic force may be applied in the direction of arrow 450. Arrow 452 illustrates the component of force 450 that is normal to active surface 435 of anode 430. In the case of a curved surface (for example, a concave surface or a convex surface), the component of the anisotropic force that is normal to an active surface of an electrode may correspond to the component normal to a plane that is tangent to the curved surface at the point at which the anisotropic force is applied. Referring to the cylindrical cell illustrated in FIG. 4B, a force may be applied to an external surface of the cell in the direction of, for example, arrow 450. The component of applied force 450 that is normal to the active surface of anode 430 would correspond to arrow 452. The anisotropic force may be applied, in some cases, at one or more predetermined locations, optionally distributed over the active surface of the anode. In some embodiments, the anisotropic force is applied uniformly over the active surface of the anode.

Any of the electrode properties (e.g., porosities, pore size distributions, etc.) and/or performance metrics described herein may be achieved, alone or in combination with each other, while an anisotropic force is applied to the electrochemical cell (e.g., during charge and/or discharge of the cell). In certain embodiments, the anisotropic force applied to the electrode and/or to the electrochemical cell containing the electrode (e.g., during at least one period of time during charge and/or discharge of the cell) can include a component normal to an active surface of an electrode (e.g., an anode such as a lithium metal and/or lithium alloy anode within the electrochemical cell and/or the porous electrode comprising multiple porous support structures). In certain embodiments, the component of the anisotropic force that is normal to the active surface of the electrode defines a pressure of at least about 20, at least about 25, at least about 35, at least about 40, at least about 50, at least about 75, at least about 90, at least about 100, at least about 125 or at least about 150 Newtons per square centimeter, while the desired electrode properties are present. In certain embodiments, the component of the anisotropic force normal to the active surface may, for example, define a pressure of less than about 200, less than about 190, less than about 175, less than about 150, less than about 125, less than about 115, or less than about 110 Newtons per square centimeter, while the desired electrode properties are present. While forces and pressures are generally described herein in units of Newtons and Newtons per unit area, respectively, forces and pressures can also be expressed in units of kilograms-force and kilograms-force per unit area, respectively. One or ordinary skill in the art will be familiar with kilogram-force-based units, and will understand that 1 kilogram-force is equivalent to about 9.8 Newtons.

In certain embodiments, the anisotropic force can be applied to an electrochemical cell, and the component of the anisotropic force normal to the active surface of an electrode within the electrochemical cell is at least about 50%, at least about 75%, at least about 100%, at least about 120% of the yield stress of that electrode (e.g., during charge and/or discharge of the electrochemical cell). In certain embodiments, the component of the anisotropic force normal to the electrode active surface of an electrode within the electrochemical cell is less than about 250% or less than about 200% of the yield stress of that electrode (e.g., during charge and/or discharge of the electrochemical cell). For example, in some embodiments, the electrochemical cell can comprise a non-porous electrode (e.g., an anode such as an anode comprising lithium metal and/or a lithium alloy), and the component of the anisotropic force normal to the active surface of the non-porous electrode can be at least about 50%, at least about 75%, at least about 100%, at least about 120% of the yield stress of the non-porous electrode (and/or less than about 250% or less than about 200% of the yield stress of the non-porous electrode).

In certain embodiments, the pore distributions described herein can be achieved while an anisotropic force (e.g., having a component normal to an active surface of an electrode that defines a pressure of between about 20 Newtons/cm$^2$ and about 200 Newtons/cm$^2$, or within any of the ranges outlined above) is applied to the electrode (e.g., via application of an anisotropic force to an electrochemical cell containing the electrode). This can be accomplished by fabricating a porous support structure (e.g., a large-scale porous support structure) within the electrode that are capable of maintaining their porosities under applied loads. A porous support structure that resists deformation under an applied load can allow the electrode containing the porous support structure to maintain its permeability under pressure, and can allow the electrode to maintain the enhanced rate capabilities described herein. In some embodiments, the yield strength of a porous support structure (e.g., a large scale porous support structure) and/or the yield strength of the resulting electrode produced from the porous support structure can be at least about 200 Newtons/cm$^2$, at least about 350 Newtons/cm$^2$, or at least about 500 Newtons/cm$^2$.

In some embodiments, the electrode can be configured such that its porosity does not change or changes only to a small degree when an anisotropic force is applied to the electrode and/or the electrochemical cell in which the electrode is contained. For example, in certain embodiments, the porosity of the electrode (and/or a porous support structure within an electrode) changes by less than 20%, less than about 10%, or less than about 5% when an anisotropic force is applied (e.g., having a component normal to an active surface of an electrode that defines a pressure of between about 20 Newtons/cm² and about 200 Newtons/cm², or within any of the ranges outlined above), relative to the porosity in the absence of the applied force but under otherwise identical conditions.

The anisotropic forces described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. patent application Ser. No. 12/535,328, filed Aug. 4, 2009, entitled "Application of Force in Electrochemical Cells" to Scordilis-Kelley et al. which are incorporated herein by reference in their entirety.

Electrochemical cells using the electrodes described herein may be capable of achieving enhanced performance. In some embodiments, the electrochemical cell may exhibit high electrode active species utilization. As used herein, "utilization" refers to the extent to which the electrode active material (e.g., sulfur as the cathode active material) within a cell reacts to form desirable reaction products, such that the electrochemical performance (as measured by the discharge capacity) is enhanced. For example, an electrochemical cell is said to utilize 100% of the total sulfur in the cell when all of the sulfur in the cell is completely converted to the desired reaction product (e.g., $S^{2-}$ in the case of sulfur as the cathode active material), thus providing the theoretical discharge capacity of 1672 mAh/g of total sulfur in the cell. It is to be understood that wherever "sulfur" is used as an exemplary electrode active material (e.g., cathode active material), any other electrode active material suitable for use with the invention can be substituted. The theoretical capacity of any electrode active material can be calculated by the following formula:

$$Q = \frac{nF}{3600M}$$

wherein,

Q=Theoretical capacity, Ah/g (ampere hour per gram)

n=number of electrons involved in the desired electrochemical reaction,

F=Faraday constant, 96485 C/equi,

M=Molecular mass of electrode active material, gram

3600=Number of seconds in one hour.

Those of ordinary skill in the art would be able to calculate the active material theoretical capacity and compare it to the experimental active material capacity for a particular material to determine whether or not the experimental capacity is at least some percent (e.g., 60%), or greater, of the theoretical capacity. For example, when elemental sulfur (S) is used as the cathode active material and $S^{2-}$ is the desired reaction product, the theoretical capacity is 1672 mAh/g. That is, a cell is said to utilize 100% of the total sulfur in the cell when it produces 1672 mAh/g of total sulfur in the cell, 90% of the total sulfur in the cell when it produces 1504.8 mAh/g of total sulfur in the cell, 60% of the total sulfur in the cell when it produces 1003.2 mAh/g of total sulfur in the cell, and 50% of the total sulfur in the cell when it produces 836 mAh/g of total sulfur in the cell.

In some embodiments, it is possible for the amount of sulfur (or other active material) in the region of the cell that is enclosed by the cathode and anode ("available" sulfur) to be less than that of the total sulfur in the cell. In some cases the electrolyte may be located both in the region enclosed by the anode and cathode and the region not enclosed by the cathode and anode. For example, during charge/discharge cycles under pressure, it is possible for the un-reacted species in the region enclosed by anode and cathode to move out either by diffusion or by the movement of the electrolyte. The utilization expressed based on this "available" electrode active material is the measure of the ability of the cathode structure to facilitate the conversion of the electrode active material in the region enclosed between the cathode and anode to desirable reaction product (e.g., $S^{2-}$ in the case of sulfur as the cathode active material). For example, if all the sulfur available in the region enclosed between the cathode and anode is completely converted to desired reaction product, then the cell will be said to utilize 100% of the available sulfur, and will produce 1672 mAh/g of available sulfur.

In some embodiments, the electrochemical cell can be designed in such a way that either all of the electrolyte is located in between the region enclosed by the anode and cathode or the transport of un-reacted species from the enclosed region to the outside is substantially completely eliminated. For such embodiments, the utilization expressed as mAh/g of available sulfur will be equal to that expressed as mAh/g of total sulfur in the cell.

Electrode active material (e.g., sulfur) utilization may vary with the discharge current applied to the cell, among other things. In some embodiments, electrode active material utilization at low discharge rates may be higher than electrode active material utilization at high discharge rates. In some embodiments, the cell is capable of utilizing at least about 60%, at least about 65%, at least about 70%, at least about 75%, at least about 80%, at least about 85%, at least about 90%, or at least about 92% of the total electrode active material (e.g., sulfur) in the cell over at least one charge and discharge cycle. In some embodiments, the cell is capable of utilizing at least about 60%, at least about 65%, at least about 70%, at least about 75%, at least about 80%, at least about 85%, at least about 90%, or at least about 92% of the available electrode active material (e.g., sulfur) over at least one charge and discharge cycle.

In some cases, the utilization rates of electrochemical cells described herein may remain relatively high through a relatively large number of charge and discharge cycles. As used herein, a "charge and discharge cycle" refers to the process by which a cell is charged from 0% to 100% state of charge (SOC) and discharged from 100% back to 0% SOC. In some embodiments, the electrochemical cell may be capable of utilizing at least about 60%, at least about 65%, at least about 70%, at least about 75%, at least about 80%, at least about 85%, or at least about 90% of the sulfur (e.g., total sulfur in the cell, available sulfur) or other electrode active material through at least a first charge and discharge cycle and at least about 1, 2, 10, 20, 30, 50, 75, 100, 125, or 135 charge and discharge cycles subsequent to the first charge and discharge cycle. In certain embodiments, electrochemical cells of the present invention will cycle at least 1 time, at least 2 times, at least 10 times, at least 20 times, at least 30 times, at least 50 times, at least 75 times, at least 100 times, at least 125 times, or at least 135 times subsequent to a first charge and discharge cycle with each cycle having a sulfur utilization (measured as a fraction of 1672 mAh/g sulfur (e.g., total sulfur in the cell, available sulfur) output during the discharge phase of the cycle) or other electrode active material utilization of at least about 40-50%, at least about 50-60%, at least about 40-60%, at least about 40-80%, at least about 60-70%, at least about 70%, at least about 70-80%, at least about 80%, at least about 80-90%, or at least about 90% when discharged at a moderately high discharge current of at least about 100 mA/g of sulfur (e.g., a discharge current between 100-200 mA/g, between 200-300 mA/g, between 300-400 mA/g, between 400-500 mA/g, or between 100-500 mA/g).

Some of the electrochemical cells described herein may maintain capacity over a relatively large number of charge and discharge cycles. For example, in some cases, the electrochemical cell capacity decreases by less than about 0.2% per charge and discharge cycle over at least about 2, at least about 10, at least about 20, at least about 30, at least about 50, at least about 75, at least about 100, at least about 125, or at least about 135 cycles subsequent to a first charge and discharge cycle.

In some embodiments, the electrochemical cells described herein may exhibit relatively high capacities after repeated cycling of the cell. For example, in some embodiments, after alternatively discharging and charging the cell three times, the cell exhibits at least about 50%, at least about 80%, at least about 90%, or at least about 95% of the cell's initial capacity at the end of the third cycle. In some cases, after alternatively discharging and charging the cell ten times, the cell exhibits at least about 50%, at least about 80%, at least about 90%, or at least about 95% of the cell's initial capacity at the end of the tenth cycle. In still further cases, after alternatively discharging and charging the cell twenty-five times, the cell exhibits at least about 50%, at least about 80%, at least about 90%, or at least about 95% of the cell's initial capacity at the end of the twenty-fifth cycle.

In some embodiments, the electrochemical cells described herein may achieve relatively high charge efficiencies over a large number of cycles. As used herein, the "charge efficiency" of the Nth cycle is calculated as the discharge capacity of the (N+1)th cycle divided by the charge capacity of the Nth cycle (where N is an integer), and is expressed as a percentage. In some cases, electrochemical cells may achieve charge efficiencies of at least about 60%, at least about 70%, at least about 80%, at least about 90%, at least about 95%, at least about 97%, at least about 98%, at least about 99%, at least about 99.5%, or at least about 99.9% for the first cycle. In some embodiments, charge efficiencies of at least about 60%, at least about 70%, at least about 80%, at least about 90%, at least about 97%, at least about 98%, at least about 99%, at least about 99.5%, or at least about 99.9% may be achieved for the 10th, 20th, 30th, 50th, 75th, $100^{th}$, 125th, or 135th cycles subsequent to a first charge and discharge cycle.

The electrochemical cells described herein may be operated using relatively high discharge current densities, in some cases. As used herein, the "discharge current density" refers to the discharge current between the electrodes, divided by the area of the electrode over which the discharge occurs, as measured perpendicular to the direction of the current. For the purposes of discharge current density, the area of the electrode does not include the total exposed surface area of the electrode, but rather, refers to an imaginary plane drawn along the electrode surface perpendicular to the direction of the current. In some embodiments, the electrochemical cells may be operated at a discharge current density of at least about 0.1 mA/cm$^2$, at least about 0.2 mA/cm$^2$, at least about 0.4 mA/cm$^2$ of the cathode surface, or higher. The cells described herein may also be operated, in some cases, at a high discharge current per unit mass of active material. For example, the discharge current may be at least about 100, at least about 200, at least about 300, at least about 400, or at least about 500 mA per gram of active material in an electrode (e.g., sulfur in the cathode), or higher.

As noted elsewhere, in certain embodiments, electrode active material can be at least partially contained within the pores of the first and/or second porous support structures. Also, in certain embodiments, a first porous support structure (e.g., a small-scale porous support structure) can be at least partially contained within the pores of a second porous support structure (e.g., a large-scale porous support structure). A first material that is said to be "at least partially contained" within the pores of a second material is one that at least partially lies within the imaginary volumes defined by the outer boundaries of the pores of the second material. For example, a material at least partially contained within a pore can be fully contained within the pore, or may only have a fraction of its volume contained within the pore, but a substantial portion of the material, overall, is contained within the pore. In certain embodiments, a first material (e.g., an electrode active material, a porous support structure, etc.) is at least partially contained within the pores of a second material (e.g., a porous support structure) when at least about 30 wt %, at least about 50 wt %, at least about 70 wt %, at least about 80 wt %, at least about 85 wt %, at least about 90 wt %, at least about 95 wt %, or substantially all of the first material lies within the imaginary volume defined by the outer boundaries of the pores of the second material.

The electrode configurations described herein can be used in electrochemical cells for a wide variety of devices, such as, for example, electric vehicles, load-leveling devices (e.g., for solar- or wind-based energy platforms), portable electronic devices, and the like. In some cases, the porous structures described herein may be particularly useful as electrodes in secondary electrochemical cells (i.e., rechargeable electrochemical cells) such as lithium-sulfur (L-S) electrochemical cells (including batteries comprising multiple electrochemical cells).

The systems and methods described herein can provide a variety of advantages over prior art systems. For example, the use of porous support structures with different scales can allow one to distribute particles of relatively high electrical conductivity throughout the volume of an electrode, which can enhance cell performance by transporting electrons from regions of an electrode that would otherwise not be easily transported from. In addition, the use of a relatively large scale support structure can allow one to more easily control the distribution and arrangement of the particles comprising the second porous support structure. For example, when a fiber mat is used as the first porous support structure it can be relatively easy to control the distribution of the particles used to form the second porous support structure, in contrast with many situations in which particles are used to a single electrode when unevenness of the particles can be an issue. In certain embodiments, the energy density and/or specific energy of an electrochemical cell comprising the electrodes described herein can be improved, for example, because a current collector which might otherwise be present can be replaced by the electrically conductive particles used in the first and/or second electrically conductive porous support structure. In addition, the use of two porous support structures with different scales can reduce unwanted agglomeration of particles which can produce dead zones within the electrode, which can decrease electrode permeability and decrease self-performance. In addition, in certain embodiments, the distribution of an electrically conductive large-scale porous support structure can ensure that a standalone current collector is not necessary for proper function of the electrode within an electrochemical cell. In such embodiments, the energy density and/or specific energy of the resulting electrochemical cell can be enhanced relative to the energy density and/or specific energy that would be observed in a similar cell that includes a standalone current collector in addition to and/or in place of the large-scale porous support structure.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U.S. Pub. No. 2007-0221265, and entitled "Rechargeable Lithium/Water, Lithium/Air Batteries"; International Patent Apl. Serial No. PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No. PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No. PCT/US2008/010894, filed Sep. 19, 2008, published as International Pub. No. WO/2009042071, and entitled "Electrolyte Additives for Lithium Batteries and Related Methods"; International Patent Apl. Serial No. PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12/471,095, filed May 22, 2009, now U.S. Pat. No. 8,087,309, entitled "Hermetic Sample Holder and Method for Performing Microanalysis Under Controlled Atmosphere Environment"; U.S. patent application Ser. No. 12/862,513, filed on Aug. 24, 2010, published as U.S. Patent Publication No. 2011/0068001, entitled "Release System for Electrochemical cells" (which claims priority to Provisional Patent Apl. Ser. No. 61/236,322, filed Aug. 24, 2009, entitled "Release System for Electrochemical Cells"); U.S. patent application Ser. No. 13/216,559, filed on Aug. 24, 2011, published as U.S. Patent Publication No. 2012/0048729, entitled "Electrically Non-Conductive Materials for Electrochemical Cells;" U.S. patent application Ser. No. 12/862,528, filed on Aug. 24, 2010, published as U.S. Patent Publication No. 2011/0177398, entitled "Electrochemical Cell"; U.S. patent application Ser. No. 12/862,563, filed on Aug. 24, 2010, published as U.S. Patent Pub. No. 2011/0070494, entitled "Electrochemical Cells Comprising Porous Structures Comprising Sulfur" [S1583.70029US00]; U.S. patent application Ser. No. 12/862,551, filed on Aug. 24, 2010, published as U.S. Patent Pub. No. 2011/0070491, entitled "Electrochemical Cells Comprising Porous Structures Comprising Sulfur" [S1583.70030US00]; U.S. patent application Ser. No. 12/862,576, filed on Aug. 24, 2010, published as U.S. Patent Pub. No. 2011/0059361, entitled "Electrochemical Cells Comprising Porous Structures Comprising Sulfur" [S1583.70031US00]; U.S. patent application Ser. No. 12/862,581, filed on Aug. 24, 2010, published as U.S. Patent Pub. No. 2011/0076560, entitled "Electrochemical Cells Comprising Porous Structures Comprising Sulfur" [S1583.70024US01]; U.S. patent application Ser. No. 13/240,113, filed on Sep. 22, 2011, published as U.S. Patent Pub. No. 2012/0070746, entitled "Low Electrolyte Electrochemical Cells" [S1583.70033US00]; and U.S. patent application Ser. No. 13/033,419, filed Feb. 23, 2011, published as U.S. Patent Pub. No. 2011/0206992, entitled "Porous Structures for Energy Storage Devices" [S1583.70034US00]. All other patents and patent applications disclosed herein are also incorporated by reference in their entirety for all purposes. U.S. Provisional Patent Application Ser. No. 61/598,456, filed Feb. 14, 2012, and entitled "Electrode Structure for Electrochemical Cell" is also incorporated herein by reference in its entirety for all purposes.

The following examples are intended to illustrate certain embodiments of the present invention, but do not exemplify the full scope of the invention.

EXAMPLE 1

This example describes the fabrication and testing of porous electrodes including nickel-coated carbon fiber mats, according to one set of embodiments. In this set of experiments, porous carbon particles containing elemental sulfur within the pores were suspended in a slurry and deposited into a porous nickel-coated carbon-fiber mat to form the cathode of an electrochemical cell. The cathodes were assembled into a lithium-sulfur battery, and cycling performance was measured. Rather than using a primed, metal substrate, the nickel mat served as the current collector in the cathode, thereby reducing the volume and mass of the cathode, and enhancing cell performance.

Nickel-coated carbon fiber mats were acquired from Technical Fiber Products Inc (Technical Fiber Products Optimat® Ni-carbon veil, Product code 20404E). Nickel-coated carbon-fiber mats with weights of 34 g/m$^2$ (i.e., having a mass of 34 g of material, including the weight of the fibers and the binder, per 1 m$^2$ (measured as the planar area of the top of the mat)), 17 g/m$^2$, 11 g/m$^2$ and 8 g/m$^2$ and thicknesses of 239 micrometers, 112 micrometers, 85 micrometers, and 58 micrometers, respectively, were used to form electrodes.

Figure 5:
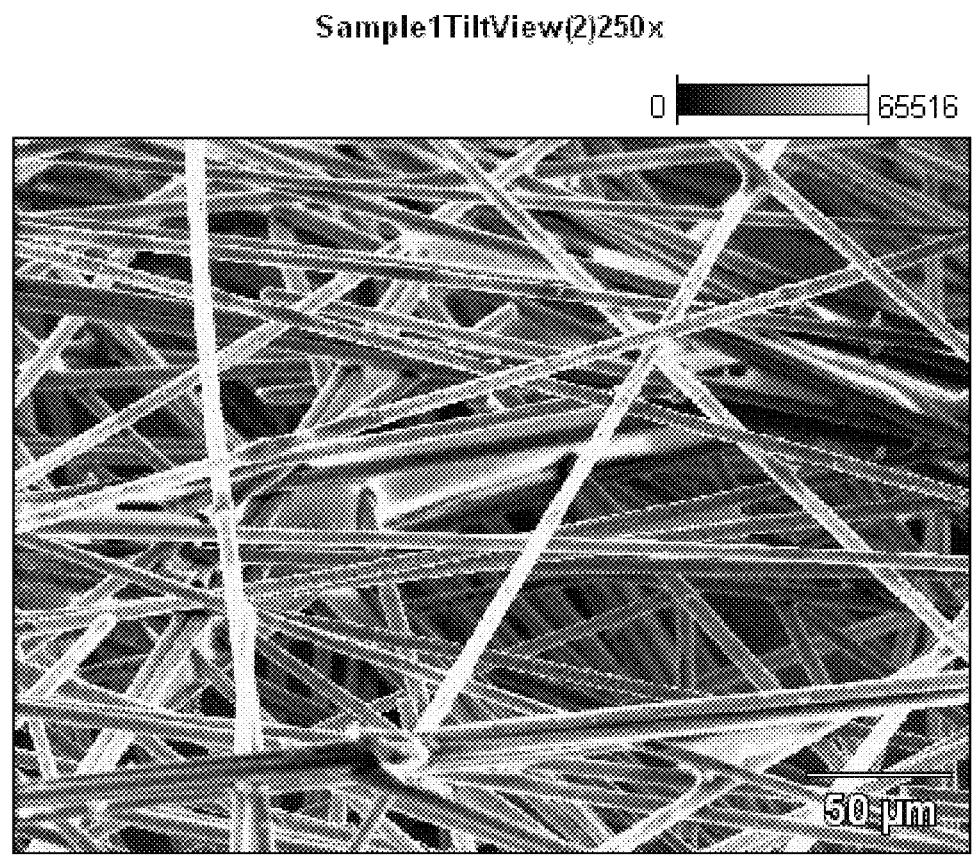
FIG. 5 is a scanning electron microscope (SEM) image of an exemplary large-scale porous support structure, according to some embodiments.
Figure 6:
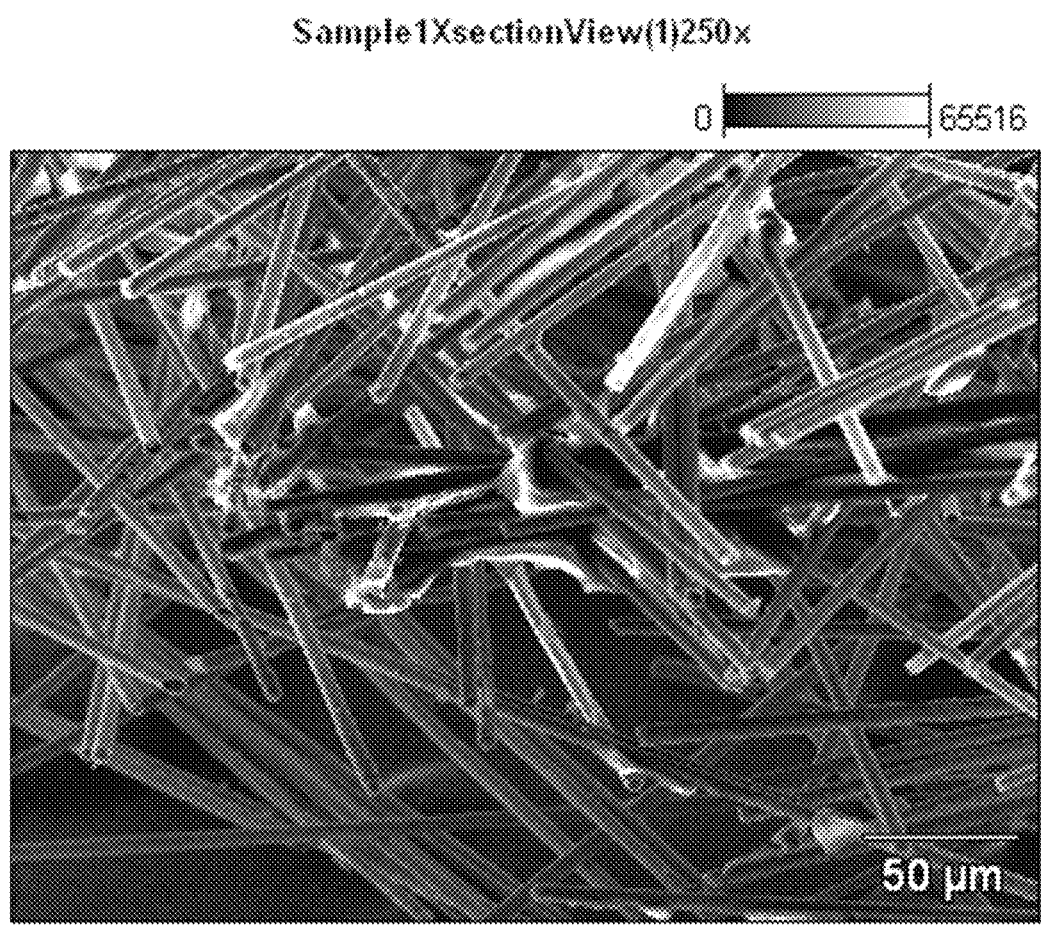
FIG. 6 is an SEM image of a cross-section of the porous support structure shown in FIG. 5.

The available surface areas of the mats (including all of the exposed surface area on the surface of and within the bulk of the mat, as opposed to the planar area of the top of the mat described above) were measured using Mercury Intrusion Porosimetry. Testing revealed that the 34 g/m$^2$ mats had available surface areas of 0.320 m$^2$/g, the 17 g/m$^2$ mats had available surface areas of 0.291 m$^2$/g, the 11 g/m$^2$ mats had available surface areas of 0.282 m²/g, and the 8 g/m² mats had available surface areas of 0.225 m²/g. The porosities of the uncoated mats were also determined using Mercury Intrusion Porosimetry, yielding porosities ranging between 92% and 96%. FIG. 5 is a scanning electron microscope (SEM) image of the 34 g/m² nickel-coated carbon-fiber mat prior to coating the mat with the cathode slurry. FIG. 6 is an SEM image of a cross-section of the nickel-coated carbon-fiber mat shown in FIG. 5.

Porous carbon containing elemental sulfur was deposited within the pores of the nickel-coated, carbon fiber mats by forming a slurry and depositing the slurry into the mats. The slurry included a polyvinyl alcohol (PVOH) binder and a solvent solution comprising isopropanol, de-ionized water and 1-methoxy 2-propanol. Solvents and binder were added to an attrition mill. Elemental sulfur (from Aldrich, mesh size of 100, and a purity of 99.8%) was added and milled for 20 minutes to reduce the particle size of the sulfur particles. Vulcan carbon black (Vulcan XC72R carbon black, from Cabot Corporation, 250 m²/g surface area) was added to the sulfur/solvent mixture, and the mixture was milled for 5 minutes. Lastly XE2 carbon black (from Printex, 1000 m²/g surface area) was added and milled for an additional 5 minutes. The final solids composition of the slurry was 55 weight % sulfur, 20 weight % Vulcan carbon black, 20 weight % XE2 carbon black, and 5 weight % PVOH binder.

The slurry was applied to the nickel mat via a slot die method. The nickel mats were placed on carrier material. The slot die was used to coat both faces of each of the nickel mats, producing double-sided cathodes. In this process, a thin layer of slurry material was applied to a first surface of the nickel mat. The slurry was evenly coated onto and throughout the mat. The mats were then dried to remove all solvents. The carrier material was then released from the coated mats once the slurries had dried. Subsequently, the slot die was used again to coat a second side of the nickel mats, producing double-sided cathodes.

Figure 7:
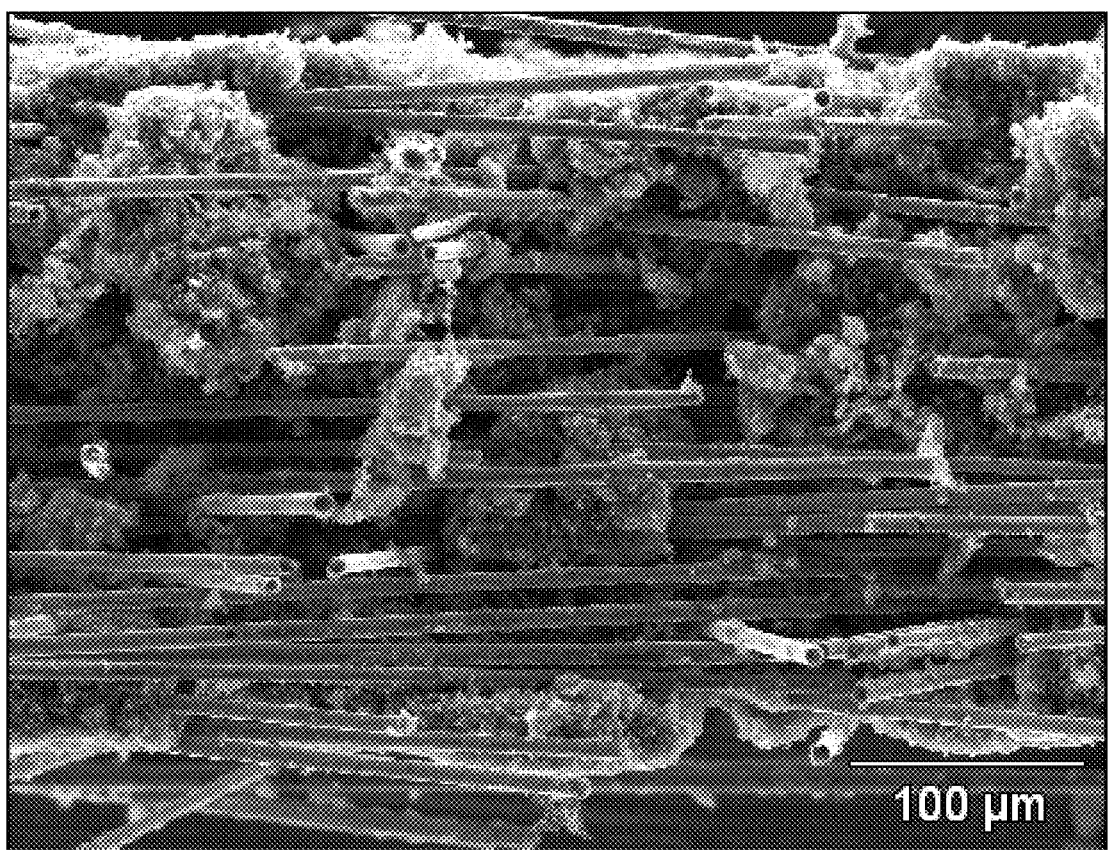
FIG. 7 is an SEM image of a porous support structure containing an electrode active material at least partially contained within the pores of a second porous support structure, according to certain embodiments.
Figure 8:
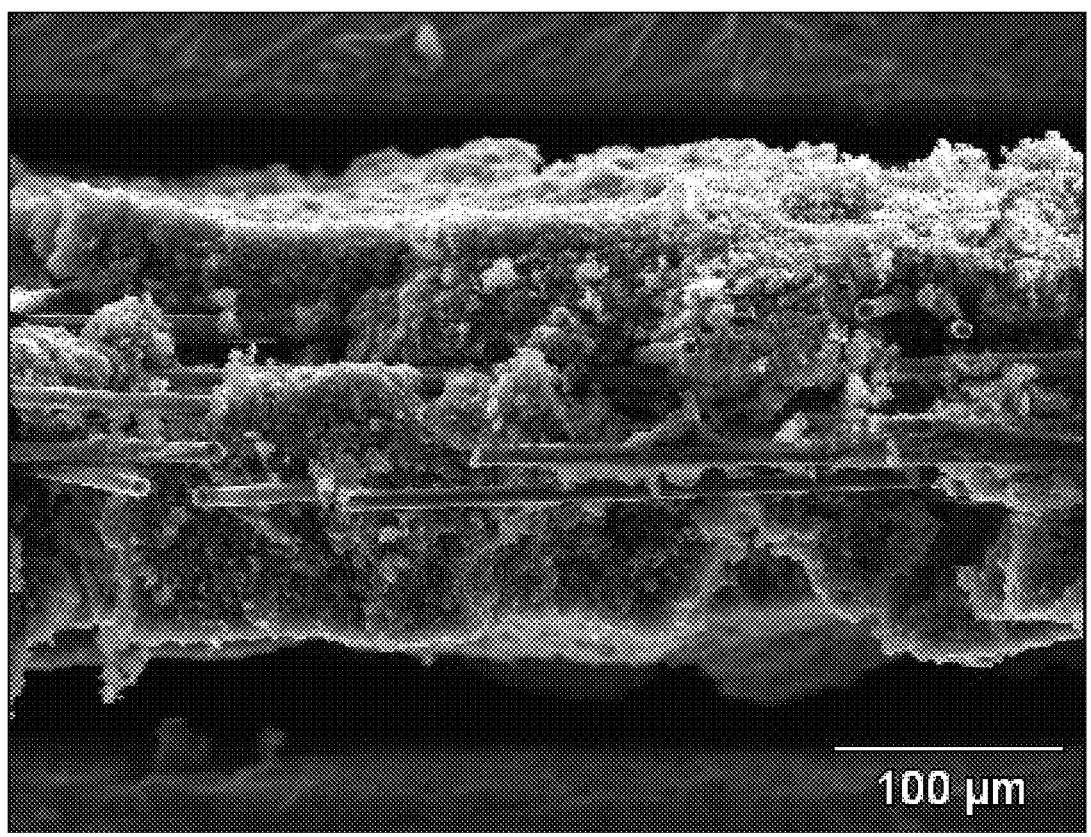
FIG. 8 is an SEM image of a cross section of a porous support structure containing an electrode active material at least partially contained within the pores of a second porous support structure, according to certain embodiments.

FIG. 7 is a scanning electron microscope (SEM) image of the 34 g/m² fiber mat after the carbon particles containing elemental sulfur were coated on each side of the mat. FIG. 8 is an SEM image of a cross section of the 17 g/m² mat coated with carbon particles. The carbon particles were coated through the mat, with some of the volume of the cathode extending beyond the original volume of the nickel mat.

Figure 9:
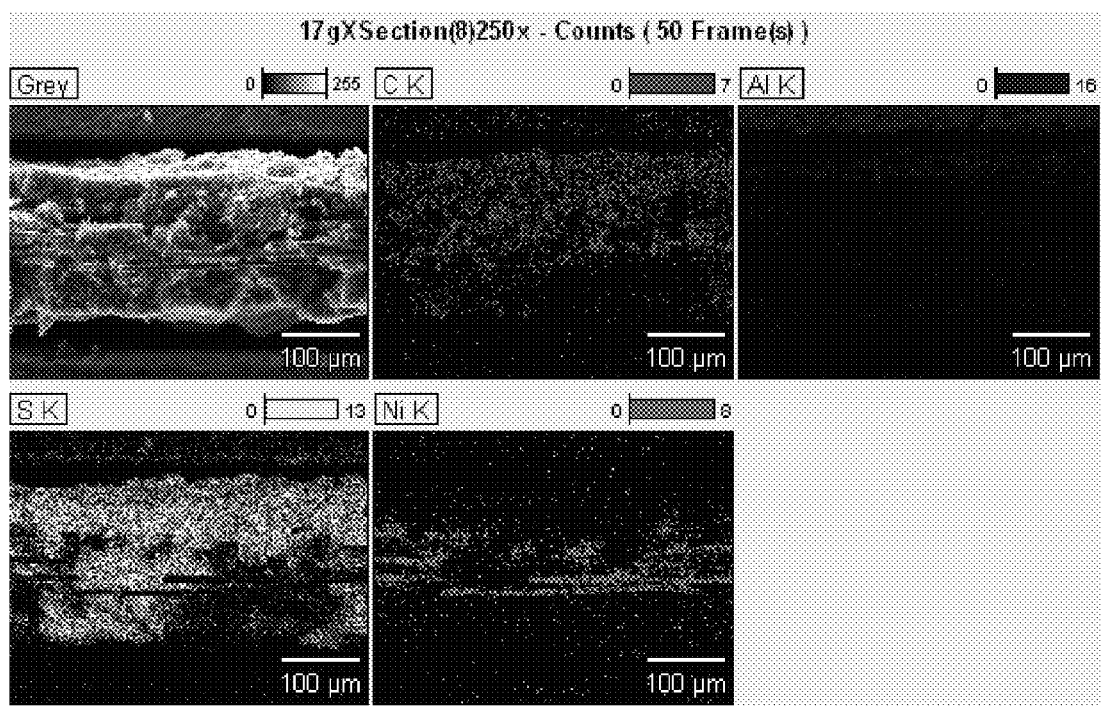
FIG. 9 is an SEM and an EDS mapping of the content of a coated electrode, according to some embodiments.

SEM-EDS mapping of the coated 17 g/m² mat was performed to confirm even distribution of the carbon particles and the sulfur within the cathode. FIG. 9 includes an SEM and an EDS mapping of the content of the coated cathode. The cathode was coated through the mat with EDS confirming that carbon and sulfur were distributed throughout the nickel mat.

Electrochemical cells including the coated nickel mat cathodes were assembled and tested. Electrodes coated on 11 g/m² and 17 g/m² nickel-coated carbon-fiber mats were fabricated and assembled in electrochemical cells. In addition, several electrodes comprising the slurry described above coated directly on 7 micrometer aluminum foil substrates (as opposed to the nickel coated carbon fiber mats) were assembled in electrochemical cells for comparative testing purposes. Electrochemical cells covering both sides of the 45 mm long by 43.5 mm wide double-sided cathodes with a 25 micrometer thick, 105 mm long, and 44.5 mm wide separator (9 micrometer Tonen separator, Toray Tonen Specialty Separators). In each cell, the separator was folded around one edge of the cathodes. After the separators were applied, 100 mm long by 42 mm wide anodes were positioned over the separators, folding the anodes around the same edge of the cathode around which the separator was folded. Vapor deposited lithium films were used as the anodes. Electrical connection to the anode was made by welding a conductive tab to the anode film. Electrical connection to the cathode was made by directly welding conductive tabs to the nickel mats. The cells were then sealed and an electrolyte was added. The electrolyte included primarily 1-3 Dioxolane (DOL) and 1,2 Dimethoxyethane (DME) (both from Novolyte Technologies) as well as limited amounts of lithium bis(trifluoromethyl sulfonyl)imide, LiNO₃, Guanidine nitrate and Pyridine nitrate.

Each of the cells was then tested. Anisotropic forces defining a pressure of 98 Newtons/cm² (10 kg/cm²) were applied to the cells. Charge and discharge performance was then measured by discharging the cells at 13.7 mA (0.413 mA/cm²) from 2.5 V to 1.7 V and charging the cells at 7.8 mA (0.078 mA/cm²) from 1.7 V to 2.5 V.

Figure 10:
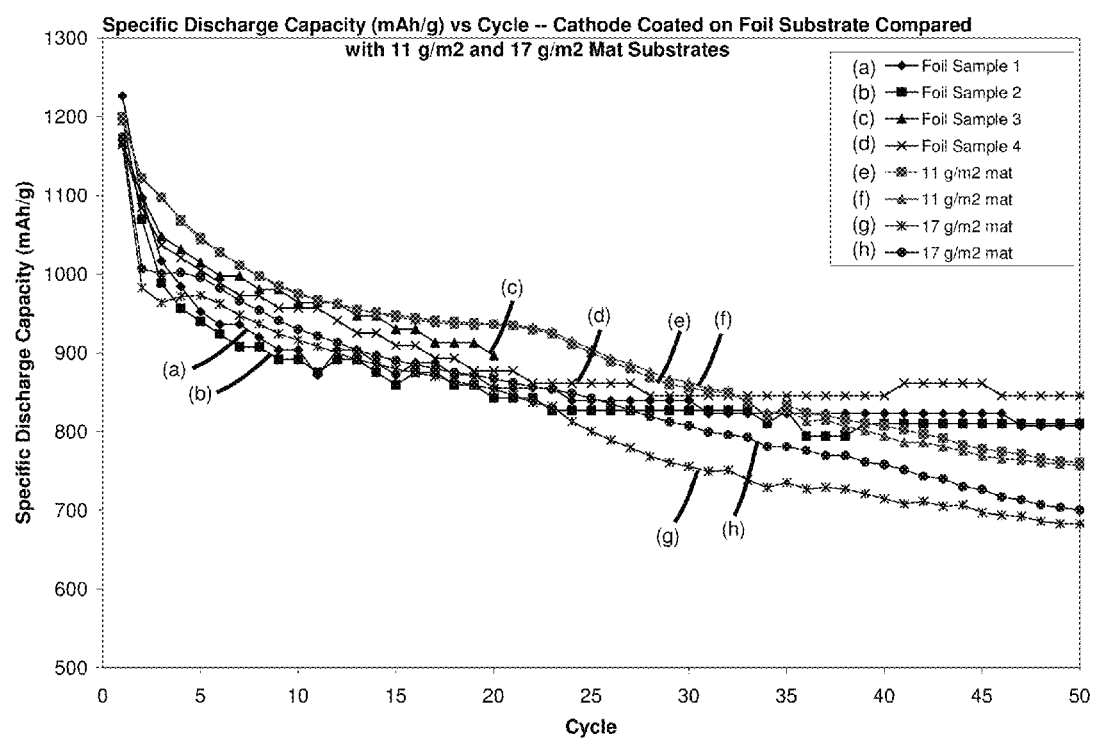
FIG. 10 is an exemplary plot, according to certain embodiments, of specific discharge capacity as a function of cycle.

FIG. 10 is a plot of specific discharge capacity as a function of charge/discharge cycle for each of the electrochemical cells. The electrochemical cells including the 11 g/m² mat cathodes exhibited a higher specific discharge capacity during the first 30 cycles, relative to the electrochemical cells including the 17 g/m² mat cathodes and aluminum foil substrate cathodes.

Figure 11:
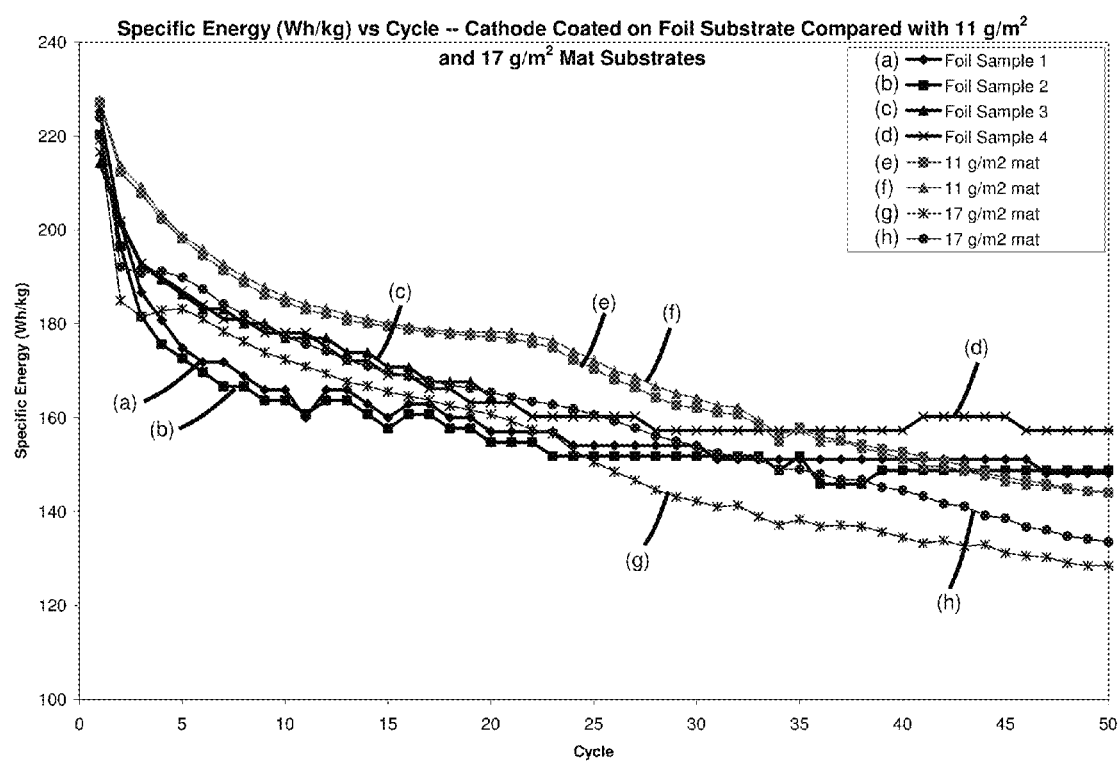
FIG. 11 is a plot of specific energy as a function of cycle, according some embodiments.

FIG. 11 is a plot of specific energy as a function of the charge/discharge cycle for each of the electrochemical cells. In these tests, the effect of the substrate weight became apparent. As illustrated in FIG. 11, at the 5th cycle, the average specific energy of cells with cathodes comprising 11 g/m² mat substrates had specific energies 20 Wh/kg higher than cells including cathodes with aluminum foil substrates.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrode for use in an electrochemical cell comprising:
    an assembly of electrically conductive elongated fibers wherein the elongated fibers comprise a metal, a polymer, and/or a glass;
    an assembly of porous particles comprising carbon at least partially contained within the assembly of electrically conductive elongated fibers; and
    an electrode active material comprising sulfur, wherein at least about 30 wt % of the electrode active material lies within pores of the porous particles.

2. The electrode of claim 1, wherein the elongated fibers are at least partially coated with an electrically conductive material.

3. The electrode of claim 1, wherein the electrode active material comprises elemental sulfur.

4. The electrode of claim 1, wherein the electrode active material comprises particles having an average maximum cross-sectional dimension of between about 0.1 microns and about 10 microns.

5. The electrode of claim 1, wherein the elongated fibers have an aspect ratio of at least about 3:1.

6. The electrode of claim 1, wherein the elongated fibers have an aspect ratio of at least about 5:1.

7. The electrode of claim 1, wherein the elongated fibers have an aspect ratio of at least about 10:1.

8. The electrode of claim 1, wherein the assembly of electrically conductive elongated fibers forms a porous support structure in which at least about 50% of the total pore volume is defined by pores having cross-sectional diameters of at least about 10 micrometers.

9. The electrode of claim 1, wherein the assembly of porous particles comprising carbon defines a porous support structure in which at least about 50% of the total pore volume is defined by pores having cross-sectional diameters of between about 0.1 micrometers and about 10 micrometers.

10. The electrode of claim 1, wherein at least about 50% of a total pore volume within the electrode, in the absence of the electrode active material, is defined by pores having cross-sectional diameters of between about 0.1 micrometers and about 10 micrometers.

11. The electrode of claim 1, wherein the assembly of electrically conductive elongated fibers forms a cohesive structure that can be bent, moved, or otherwise manipulated without falling apart.

12. An electrochemical cell comprising the electrode of claim 1.

13. The electrochemical cell of claim 12, wherein the electrochemical cell is a rechargeable electrochemical cell.

14. The electrochemical cell of claim 13, wherein the electrochemical cell comprises a lithium-sulfur electrochemical cell.

* * * * *